United States Patent
Villanueva

(10) Patent No.: US 11,994,236 B2
(45) Date of Patent: May 28, 2024

(54) IMPACT DRIVER VALVE SYSTEMS

(71) Applicant: Gabriel T. Villanueva, San Manuel, AZ (US)

(72) Inventor: Gabriel T. Villanueva, San Manuel, AZ (US)

(*) Notice: Subject to any disclaimer, the term of this patent is extended or adjusted under 35 U.S.C. 154(b) by 0 days.

(21) Appl. No.: 17/980,388

(22) Filed: Nov. 3, 2022

(65) Prior Publication Data
US 2023/0133673 A1 May 4, 2023

Related U.S. Application Data

(60) Provisional application No. 63/275,790, filed on Nov. 4, 2021.

(51) Int. Cl.
| | | |
|---|---|---|
| *F16K 31/50* | (2006.01) | |
| *F16K 3/02* | (2006.01) | |
| *F16K 31/04* | (2006.01) | |
| *F16K 31/53* | (2006.01) | |
| *F16K 31/60* | (2006.01) | |

(52) U.S. Cl.
CPC .......... *F16K 31/508* (2013.01); *F16K 3/0254* (2013.01); *F16K 3/0281* (2013.01); *F16K 31/047* (2013.01); *F16K 31/60* (2013.01)

(58) Field of Classification Search
CPC .... F16K 31/508; F16K 3/0254; F16K 3/0281; F16K 31/60; F16K 1/221; F16K 3/36; F16K 31/46; F16K 31/535
See application file for complete search history.

(56) References Cited

U.S. PATENT DOCUMENTS

| | | | |
|---|---|---|---|
| 377,611 A | 2/1888 | Harley | E05B 1/0015 |
| 2,000,853 A | 5/1935 | Lange | F16K 3/02 |
| 2,075,123 A | 4/1936 | Lunken | 251/63 |
| 2,060,571 A | 11/1936 | Hanson | F16K 3/02 |
| 2,550,984 A | 5/1951 | Ferguson | F16K 3/0209 |
| 2,797,062 A | 6/1957 | Otter | F16K 3/28 |
| 2,891,762 A | 6/1959 | Kellogg | F16K 3/0281 |

(Continued)

FOREIGN PATENT DOCUMENTS

| | | | |
|---|---|---|---|
| CN | 105757265 A | * | 7/2016 |
| CN | 111120714 A | * | 5/2020 |

(Continued)

OTHER PUBLICATIONS

Office Action issued in U.S. Appl. No. 15/154,856 dated Jan. 31, 2020 (26 pgs).

(Continued)

*Primary Examiner* — Marina A Tietjen
(74) *Attorney, Agent, or Firm* — HAYES SOLOWAY P.C.

(57) ABSTRACT

A knife gate valve includes a shutoff apparatus and a valve stem in communication with the shutoff apparatus. The valve stem includes a threaded portion and a journaled portion above the threaded portion. The journaled portion has a diameter smaller than a diameter of the threaded portion. A head portion is sized and shaped to engage with a powered rotational tool. A yoke has a journal cutout through which the journaled portion of the valve stem is positioned. A vertical position of the valve stem is maintained by the yoke. The valve stem is rotatable within the yoke to operate the shutoff apparatus.

18 Claims, 19 Drawing Sheets

(56) References Cited

U.S. PATENT DOCUMENTS

| | | | |
|---|---|---|---|
| 2,936,667 A | 5/1960 | Thorberg | F16B 35/06 |
| 3,033,517 A | 5/1962 | Rovang | F16K 3/0281 |
| 3,180,599 A * | 4/1965 | Nestor | F16K 31/60 248/75 |
| 3,319,661 A | 5/1967 | Shindler | F16K 3/312 |
| 3,710,816 A | 1/1973 | Prince | F16K 3/0281 |
| 3,749,114 A | 7/1973 | Johnstone | F16K 3/0281 |
| D248,824 S | 8/1978 | Imai | D8/387 |
| D256,947 S | 9/1980 | Terrazas | |
| 4,326,557 A | 4/1982 | Behle | F16K 1/02 |
| D265,174 S | 6/1982 | Boyle | D8/387 |
| D273,460 S | 4/1984 | Sturm | D8/387 |
| 4,532,957 A | 8/1985 | Battle et al. | 137/375 |
| D289,915 S | 5/1987 | Beltran | |
| 4,679,770 A | 7/1987 | Liberman | F16K 3/0281 |
| 4,928,919 A | 5/1990 | Daicho | F16K 1/302 |
| D310,956 S | 10/1990 | Huska | D8/387 |
| D318,316 S | 7/1991 | Hengesbach | |
| 5,269,340 A | 12/1993 | Drzewiecki | F16L 41/065 |
| D352,656 S | 11/1994 | Rodman | D8/385 |
| D353,147 S | 12/1994 | Bergman | |
| D353,562 S | 12/1994 | Ewers | |
| 5,370,149 A | 12/1994 | Clarkson | F16K 3/0281 |
| D368,019 S | 3/1996 | Ohtsuka | D8/387 |
| 5,653,423 A | 8/1997 | Young | F16K 3/0227 |
| 5,657,961 A | 8/1997 | Kalsi | F16K 3/12 |
| 5,722,450 A | 3/1998 | Julicher | E03B 9/06 |
| 5,829,734 A | 11/1998 | Freudendahl | F16K 3/02 |
| 5,979,874 A | 11/1999 | Gambetta | F16K 3/0281 |
| 5,992,440 A | 11/1999 | Betz | F16K 31/508 |
| D426,766 S | 6/2000 | Burchall | D8/387 |
| D434,148 S | 11/2000 | Trocar | |
| D446,219 S | 8/2001 | Miyoshi | |
| 6,422,535 B1 | 7/2002 | Stone | F16K 3/0227 |
| D499,010 S | 11/2004 | Velten | D8/387 |
| D536,100 S | 1/2007 | Svedberg | |
| D563,216 S | 3/2008 | Suehiro | D8/387 |
| D576,027 S | 9/2008 | Lanz | D8/387 |
| D585,730 S | 2/2009 | Fernandez | D8/387 |
| D589,786 S | 4/2009 | Suehiro | D8/387 |
| D590,703 S | 4/2009 | Suehiro | D8/387 |
| D592,043 S | 5/2009 | Suehiro | D8/387 |
| 7,537,198 B2 | 5/2009 | Petersen | F16K 3/0272 |
| D614,941 S | 5/2010 | Murphy | D8/387 |
| D631,736 S | 2/2011 | You | |
| D639,152 S | 6/2011 | Watts | D8/387 |
| D698,634 S | 2/2014 | Oetlinger | D8/387 |
| D757,900 S | 5/2016 | Yakushijin | D23/233 |
| D779,930 S | 2/2017 | Chen | D8/387 |
| 10,060,115 B2 | 8/2018 | Miller | E03D 11/17 |
| D842,084 S | 3/2019 | Roebrugh | D8/382 |
| D847,595 S | 5/2019 | Hampton | D8/14 |
| D854,919 S | 7/2019 | Villanueva | D8/387 |
| 10,794,495 B2 | 10/2020 | Villanueva | F16K 3/02 |
| 2003/0062502 A1 | 4/2003 | Knobbe | F16K 3/0254 |
| 2004/0217319 A1 | 11/2004 | Reeves | F16K 3/0227 |
| 2005/0098756 A1 | 5/2005 | Gravningen | F16K 3/0227 |
| 2005/0173667 A1 | 8/2005 | Zheng | F16K 3/0254 |
| 2006/0118380 A1 | 6/2006 | Aeberhard | B25B 23/141 |
| 2006/0237681 A1 | 10/2006 | Petersen | F16K 3/0272 |
| 2007/0251579 A1 | 11/2007 | Weide | F16L 29/00 |
| 2009/0232619 A1 | 9/2009 | Baumgartner | F16B 25/0021 |
| 2009/0236554 A1 | 9/2009 | Gifford et al. | F16K 3/12 |
| 2010/0264350 A1 | 10/2010 | Langmesser | F16K 3/0227 |
| 2011/0001076 A1 | 1/2011 | Sidler | F16K 3/0263 |
| 2011/0083747 A1 | 4/2011 | Orino | C10B 25/10 |
| 2013/0180612 A1 | 7/2013 | Morrison | F16K 31/50 |
| 2014/0332707 A1 | 11/2014 | Reilly | F16K 3/0281 |
| 2015/0308083 A1 | 10/2015 | Qingwei | F16K 37/0058 |
| 2016/0138721 A1 | 5/2016 | Burgess | F16K 3/02 |
| 2016/0327198 A1 | 11/2016 | Sundria | F16K 31/504 |
| 2017/0016551 A1 | 1/2017 | Villanueva | F16K 31/50 |
| 2017/0067573 A1 | 3/2017 | Herman | F16K 31/508 |
| 2018/0128383 A1 | 5/2018 | Sutterfield et al. | F16K 3/34 |
| 2018/0180186 A1 | 6/2018 | Kim | F16K 3/312 |
| 2018/0281029 A1 | 10/2018 | Maichel | F16K 43/001 |
| 2018/0363786 A1 | 12/2018 | Sundria | F16K 27/044 |
| 2020/0240537 A1 | 7/2020 | Moseley et al. | F16K 3/30 |

FOREIGN PATENT DOCUMENTS

| | | | | |
|---|---|---|---|---|
| WO | WO-2016146124 A1 | * | 9/2016 | F16K 27/04 |
| WO | WO-2018006911 A1 | * | 1/2018 | F16K 31/508 |

OTHER PUBLICATIONS

Office Action issued in U.S. Appl. No. 15/154,856 dated Sep. 19, 2019 (15 pgs).

Office Action issued in U.S. Appl. No. 29/693,097 dated Jun. 1, 2020 (27 pgs).

Notice of Allowance issued in U.S. Appl. No. 15/154,856 dated May 26, 2020.

International Search Report and Written Opinion issued in PCT/US22/48869, dated Feb. 1, 2023, 7 pgs.

* cited by examiner

IMPACT DRIVER VALVE SYSTEMS

CROSS REFERENCE TO RELATED APPLICATION

This application claims benefit of U.S. Provisional Application Ser. No. 63/275,790 filed Nov. 4, 2021, the entire disclosure of which is incorporated herein by reference.

FIELD OF THE DISCLOSURE

The present disclosure is generally related to valve systems and more particularly is related to valve systems for use with electrically-powered tools.

BACKGROUND OF THE DISCLOSURE

Industrial valves are used to regulate the flow of liquids, gases, and slurries through pipes in a number of applications, including mining, oil and gas processing, factory operations, and the like. A typical valve consists of a disc, wedge, globe, ball or pinch mechanism connected by a valve stem to a handwheel. Handwheels are designed for human operation and must be turned by hand in order to reduce or increase flow. Throughout the service life of the valve, it can become increasingly difficult to operate the handwheel due to wearing of the component materials or accumulation of debris around the moving parts. Furthermore, valves can be located at remote or hard-to-reach areas, making timely operation in the event of an emergency very difficult.

Valves that operate with powered tools, such as impact drivers, are known. However, the design of the valve stems can make operation difficult due to movement of the valve stems during operation. Additionally, due to the remote locations of these valves, it is not always practical to use corded power tools that rely on electrical outlets to operate. Moreover, these valves often do not operate with handwheels, forcing a choice between manual and tool-driven operation.

Thus, a heretofore unaddressed need exists in the industry to address the aforementioned deficiencies and inadequacies.

SUMMARY OF THE DISCLOSURE

Embodiments of the present disclosure provide a knife gate valve apparatus. Briefly described, in architecture, one embodiment of the apparatus, among others, can be implemented as follows. A knife gate valve includes a shutoff apparatus and a valve stem in communication with the shutoff apparatus. The valve stem includes a threaded portion and a journaled portion above the threaded portion. The journaled portion has a diameter smaller than a diameter of the threaded portion. A head portion sized and shaped to engage with a powered rotational tool. A yoke has a journal cutout through which the journaled portion of the valve stem is positioned. A vertical position of the valve stem is maintained by the yoke. The valve stem is rotatable within the yoke to operate the shutoff apparatus.

The present disclosure can also be viewed as providing a handwheel apparatus. Briefly described, in architecture, one embodiment of the apparatus, among others, can be implemented as follows. A handwheel includes an outer handle and a center plate having a bottom portion and a top portion. The bottom portion is sized and shaped to engage with a shaft or a valve stem. The top portion is sized and shaped to engage with a rotational socket.

The present disclosure can also be viewed as providing a stemmed valve apparatus. Briefly described, in architecture, one embodiment of the apparatus, among others, can be implemented as follows. A stemmed valve apparatus includes a shutoff apparatus and a first valve stem in communication with the shutoff apparatus. A rotational transfer system is in communication with the first valve stem. A second valve stem is in communication with the rotational transfer system. The second valve stem has an end sized to engage with a powered rotational tool. Rotation of the second valve stem within the rotational transfer system causes the first valve stem to rotate. The rotation of the first and second valve stems operates the shutoff apparatus to open and close.

The present disclosure can also be viewed as providing an impact-driven valve apparatus. Briefly described, in architecture, one embodiment of the apparatus, among others, can be implemented as follows. An impact driven valve apparatus includes a shutoff apparatus and a valve stem in communication with the shutoff apparatus. The valve stem has a threaded portion and a head portion sized and shaped to engage with a powered rotational tool.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
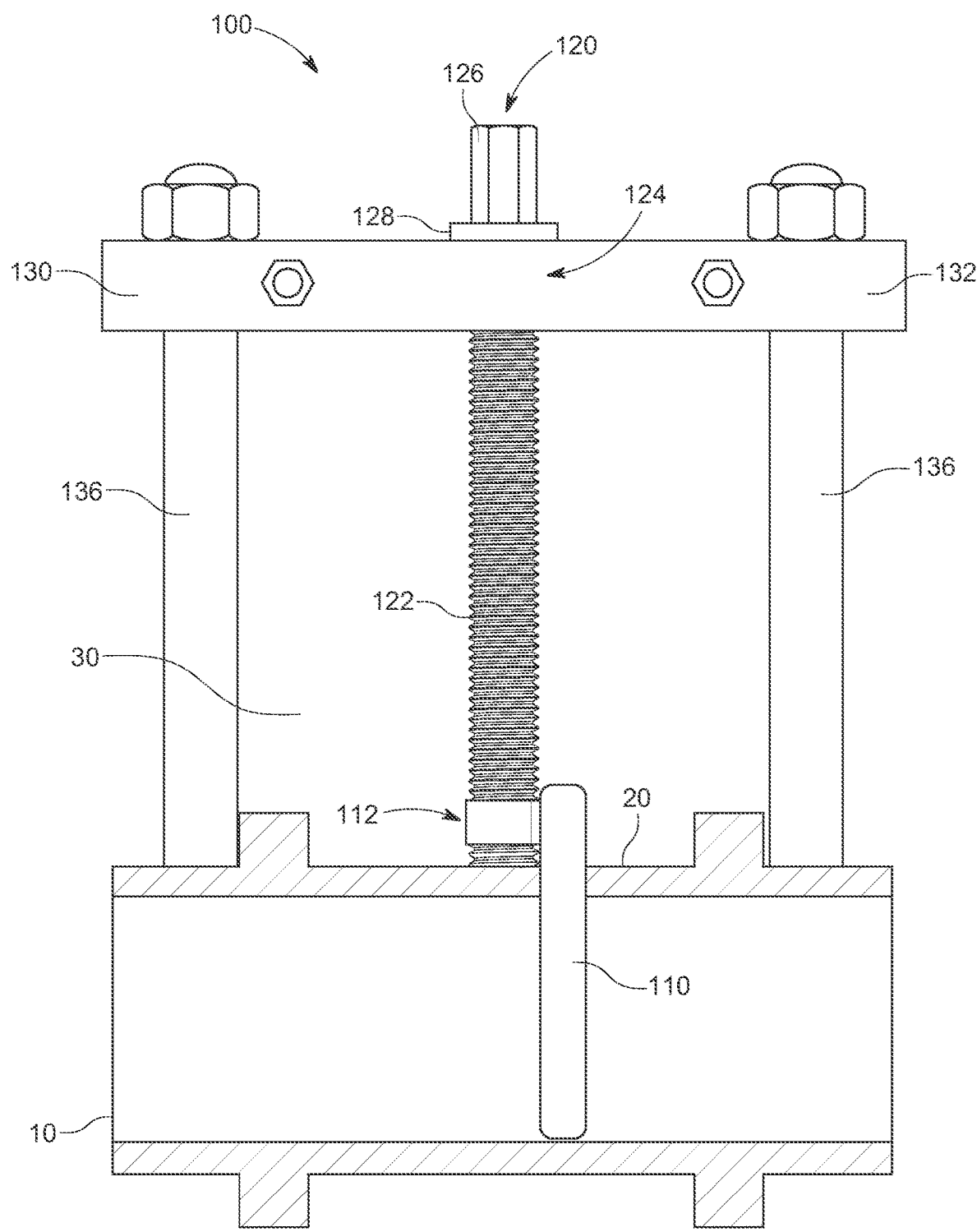
FIG. 1 is a side view illustration of a knife gate valve in partial cross section, in accordance with a first exemplary embodiment of the present disclosure.

FIG. 1 is a side view illustration of a knife gate valve 100 in partial cross section, in accordance with a first exemplary embodiment of the present disclosure. The knife gate valve 100 includes a shutoff apparatus 110 and a valve stem 120 in communication with the shutoff apparatus 110. The valve stem 120 includes a threaded portion 122 and a journaled portion 124 above the threaded portion 122. The journaled portion 124 has a diameter smaller than a diameter of the threaded portion 122. A head portion 126 is sized and shaped to engage with a powered rotational tool. A yoke 130 has a journaled cutout through which the journaled portion 124 of the valve stem 120 is positioned. A vertical position of the valve stem 120 is maintained by the yoke 130. The valve stem 120 is rotatable within the yoke 130 to operate the shutoff apparatus 110.

The knife gate valve 100 may be used in operation with a pipe 10. The pipe 10 is shown in FIG. 1 in cross-section. The pipe 10 may be any pipe or similar apparatus carrying any suitable type of material. The shutoff apparatus 110 may operate within a section of the pipe 10 to block or allow the flow of the material within the pipe 10. A valve body 20 may house the shutoff apparatus 110. Any combination of components typically used together with pipes and valve apparatuses may be used, including packing boxes, bushings, couplings, and the like.

The shutoff apparatus 110 may include any suitable type and size of shutoff apparatuses for stopping, regulating, and allowing the flow of material through a pipe 10, including wedge gates, knife gates, discs, pinch mechanisms, and the like. FIG. 1 shows a cross-section of a knife shutoff apparatus 110 in use with the knife gate valve 100. Wedge gates may include a bonnet and sealing arrangement to maintain the position of the wedge, rather than the yoke 130. In the example shown in FIG. 1, the shutoff apparatus 110 may be lifted out of the flow path of the pipe 10 to allow the flow of material, and lowered into the flow path of the pipe 10 to reduce the flow of material. FIG. 1 shows a simplified illustration of the shutoff apparatus 110 for ease of understanding the operation of the subject disclosure. However, those familiar with the art will understand that the shutoff apparatus 110 may operate in conjunction with any suitable additional components not illustrated, including bonnets, packing boxes, housings, and the like. In one example, a packing box, may contain several layers of wax rope or different types of sealing materials. When bolts or other fasteners are tightened to the packing box, it may create a seal against the shutoff apparatus 110 and the valve body.

A valve stem 120 may be in communication with the shutoff apparatus 110. In one example, the valve stem 120 and the shutoff apparatus 110 may be connected in a way that allows the shutoff apparatus 110 to travel up and down the threaded portion 122 of the valve stem 120, for instance by internal threading 112 along a portion of the shutoff apparatus 110 or a threaded portion affixed to the shutoff apparatus 110. The valve stem 120 may include a threaded portion 122, a journaled portion 124, and a head portion 126. The threaded portion 122 may have external threading along a lower aspect of the valve stem 120. In one example, the threaded portion 122 may extend at least partially between a bottom end of the valve stem 120 and the journaled portion 124. For instance, the threaded portion 122 may extend completely between the bottom end and the journaled portion 124. In another example, the threaded portion 122 may extend from the bottom end of the valve stem 120. In another example, the threaded portion 122 may extend from the journaled portion 124. The external threading and the internal threading 122 may be sized to operate together, i.e., may have the same diameter, pitch, and thread density.

The journaled portion 124 may be a portion of the valve stem 120 located above the threaded portion 122. A diameter of the journaled portion 124 may be smaller than the diameter of the threaded portion 122. This is shown in more detail relative to FIG. 4A, below. The journaled portion 124 may provide a cutout volume around which the yoke 130 may fit to maintain a vertical position of the valve stem 120 within the yoke 130. This is discussed in greater detail relative to FIGS. 2-4A, below.

The head portion 126 may be a portion of the valve stem 120 located above the journaled portion 124. The head portion 126 may include the upper aspect of the valve stem 120, i.e., may be the top of the valve stem 120. The head portion 126 may be shaped and sized to engage with a powered rotational tool. In one example, the head portion 126 may be at least partially shaped as a hexagonal head for operation with a hexagonal socket. Other shapes may include 12-point, spline, Torx, and similar shapes used in rotational connections. In operation, depending on design, the head portion 126 may be in mechanical communication with the yoke 130 in a number of different ways. Examples are illustrated in FIGS. 1-4A which include the use of single-piece yokes, multiple-piece yokes, ball bearings, flange bearings, and the like. For simplicity of discussion, the majority of the disclosure will refer to the example illustrated in FIGS. 1-3A and 4A. However, it should be understood that this is intended to be illustrative only, and that the examples shown in FIGS. 3B-3D may be included interchangeably within the full scope and operation of this disclosure as described therein.

In the example illustrated in FIG. 1, the head portion 126 may include a lip 128 located at the base of the head portion 126 and directly above the journaled portion 124. The lip 128 may have a diameter larger than the diameter of the journaled portion 124. In one example, the diameter of the lip 128 may be larger than a diameter of the top of the head portion 126, i.e., the portion that operates with a powered rotational tool. In another example, the diameter of the lip 128 may be greater than a diameter of the journal cutout of the yoke 130. The larger diameter of the lip 128 may allow the valve stem 120 to sit on and against the top of the yoke 130 when in operation. This may maintain the vertical position of the valve stem 120 relative to the yoke 130.

The yoke 130 may include a single, fixed-piece yoke or a multi-piece yoke with a removable portion. These are described relative to FIGS. 1-3D and may be used within the full scope and operation of this disclosure and with any of the other figures herein. For simplicity of discussion, the majority of the disclosure will refer to the example illustrated in FIGS. 1-3A. However, it should be understood that this is exemplary only, and that the single, fixed-piece yoke may be used in operation with the invention as described.

As shown in FIG. 1, the yoke 130 has a fixed portion 132 and a removable portion (not shown in this view). These are shown in greater detail relative to FIGS. 2-3A, below. In FIG. 1, the fixed portion 132 is shown facing out of the page, and the removable portion facing into the page; however, any suitable orientation may be considered within the scope of this disclosure. The yoke 130 may include a plurality of posts 136 connecting the fixed portion 132 with an exterior of the valve body 20. The posts 136 may extend between the fixed portion 132 and the valve body 20 to maintain the fixed portion 132 at a height above the valve body 20. In one example, the yoke 130 may include four posts 136 supporting the fixed portion 132 above the valve body 20. The posts 136 may extend through holes in the fixed portion 132 and may be fastened using any suitable fastener, such as nuts, screws, rivets, and the like.

Figure 2:
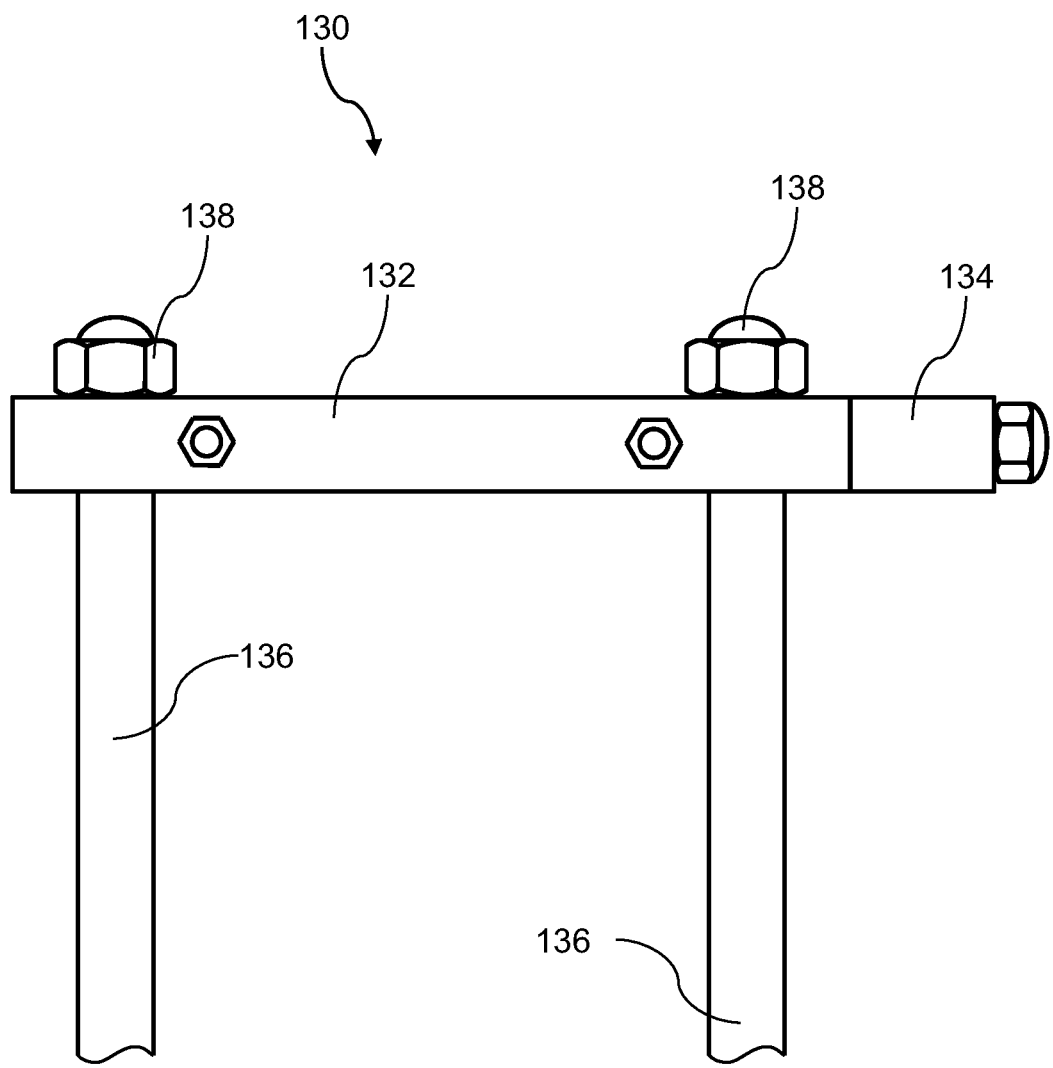
FIG. 2 is a side view illustration of the yoke of the knife gate valve, in accordance with first exemplary embodiment of the present disclosure.

FIG. 2 is a side view illustration of the yoke 130 of the knife gate valve 100, in accordance with first exemplary embodiment of the present disclosure. The fixed portion 132 is shown fixed and mounted atop a plurality of posts 136. A removable portion 134 is shown secured to a rear side of the fixed portion 132. The removable portion 134 may be removably secured to the fixed portion 132 about the journaled portion of the valve stem 120, as shown in FIG. 1. The removable portion 134 may have the same vertical thickness as the fixed portion 132 and may be secured along a horizontal plane common to the fixed portion 132 and the removable portion 134. In one example, a length of the removable portion 134 may be smaller than a length of the fixed portion 132. As shown in FIG. 2, the length of each portion 132, 134 may be the distance measured between the left and right ends of the portions 132, 134.

The posts 136 may be located toward the left and right ends of the fixed portion 132. FIG. 2 shows the fixed portion 132 being secured to the posts 136 by a fastener such as a nut 138. The nuts 138 may thread into, the posts 136 to secure the fixed portion 132 to the posts 136.

Figure 3A:
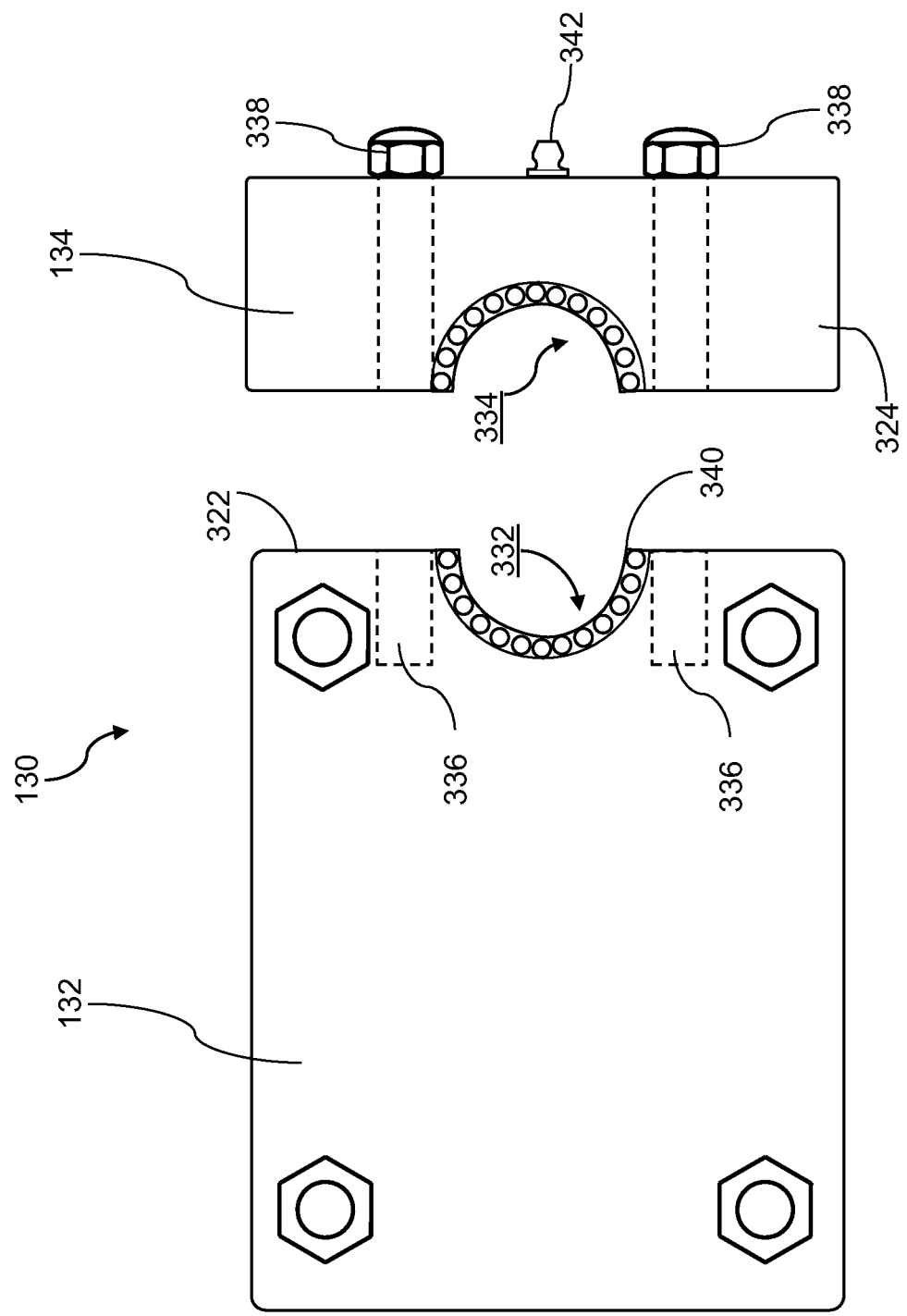
FIG. 3A is a top view illustration of the yoke of FIGS. 1 and 2, in accordance with the first exemplary embodiment of the present disclosure.

FIG. 3A is a top view illustration of the yoke 130 of FIGS. 1 and 2, in accordance with the first exemplary embodiment of the present disclosure. The fixed portion 132 and the removable portion 134 are shown in an expanded view to illustrate the separation and removal of the removable portion 134 from the fixed portion 132. In operation, the removable portion 134 may be secured to the fixed portion 132 by a plurality of fasteners such as bolts 336, illustrated in broken lines in FIG. 3. The bolts 336 may extend through the removable portion 134 and into the fixed portion 132 to secure the fixed portion 132 and removable portion 134 together. In one example, any other suitable fastener or combination of fasteners may be used. For instance, screws, cotters, pins, tongue and groove systems, locking mechanisms, and the like may be used. In one example, the fasteners may be removable, enabling the removable portion 134 to be transitioned between being secured to the fixed portion 132 and being separated from the fixed portion 132. In the example shown in FIG. 3, the bolts 336 may be threaded and may engage with internal threading within corresponding bolt holes in the fixed and removable portions 132, 134. The bolts 336 may be removable by turning the bolt heads 338 to loosen the bolts 336.

The fixed and removable portions 132, 134 may each have a journal cutout 332, 334 located at an adjoining edge of each portion 322, 324. The journal cutout 332 for the fixed portion 132 may be an area where a volume of the fixed portion 132 has been removed away from the adjoining edge 322 of the fixed portion 132. The journal cutout 334 for the removable portion 134 may be an area where a volume of the removable portion 134 has been removed away from the adjoining edge 324 of the removable portion 134. In one example, the journal cutouts 332, 334 individually may be formed as semi-circles, and together may form a circle. This shape and size may correspond to the shape and size of the journaled portion 124 of the valve stem 120. This may allow the journaled portion 124 to be placed within the journal cutouts 332, 334 when the removable portion 134 is secured to the fixed portion 132 of the yoke 130.

In one example, the yoke 130 may include bearings 340 to reduce friction, wear, and tear along the cutouts. The fixed and removable portions 132, 134 may each have a semi-circular bearing half. In one example, the bearings 340 may be replaceable and may be removed from the yoke 130 when they have worn out. The semi-circular bearing halves 340 may be received in the journal cutouts 332, 334. In another example, the yoke 130 may include a grease insert 342 or grease zerk to allow lubricant to be fed through the removable portion 134 and into the journal cutouts 332, 334 to lubricate the valve stem 120 and the yoke 130 in operation. The grease insert 342 may be any suitable type and number of inserts at any desired location on the yoke 130.

Figure 3B:
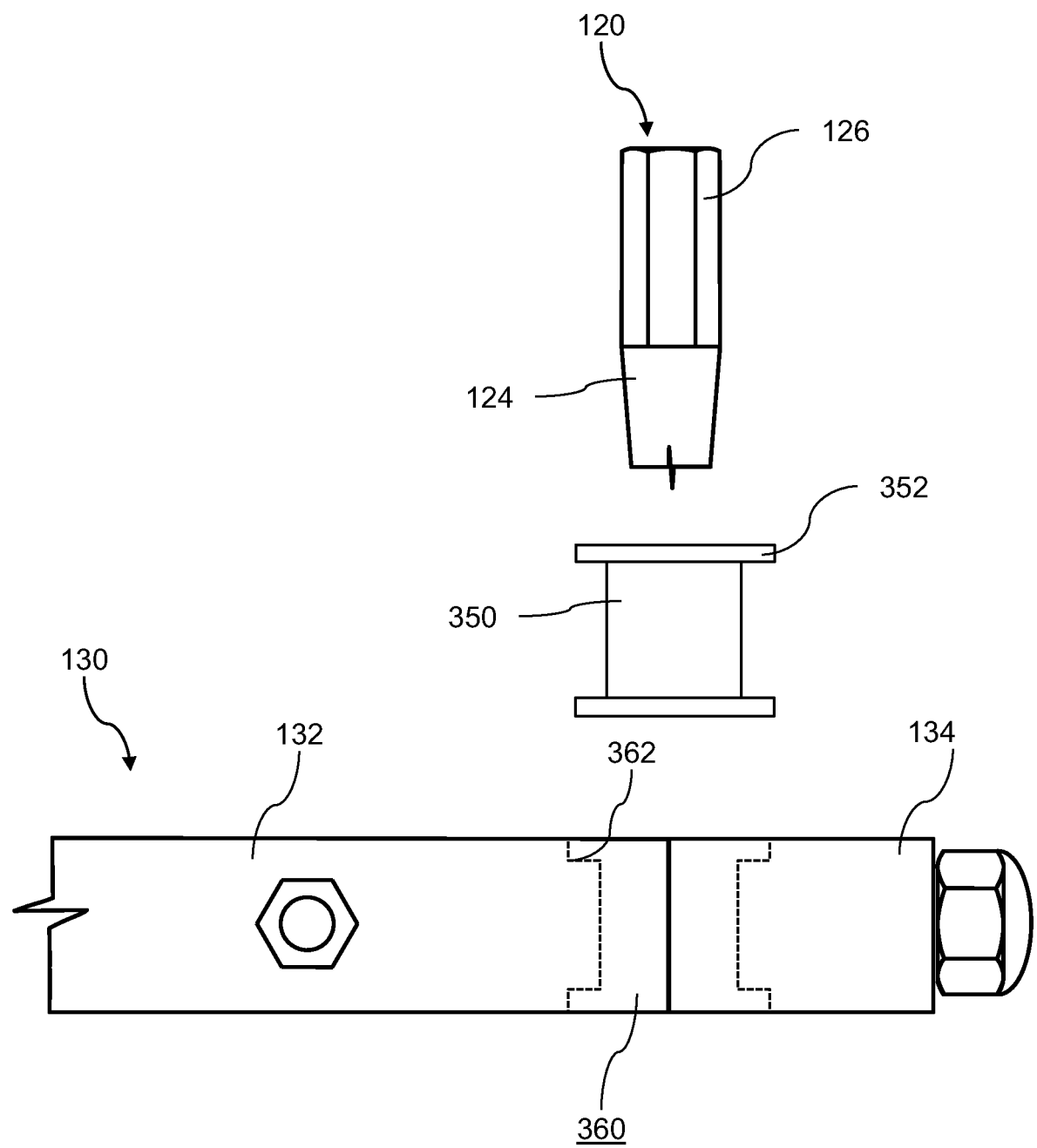
FIG. 3B is a side view illustration of the yoke having a journal cutout sized and shaped to receive a flanged ball bearing, in accordance with the first exemplary embodiment of the present disclosure.
Figure 3C:
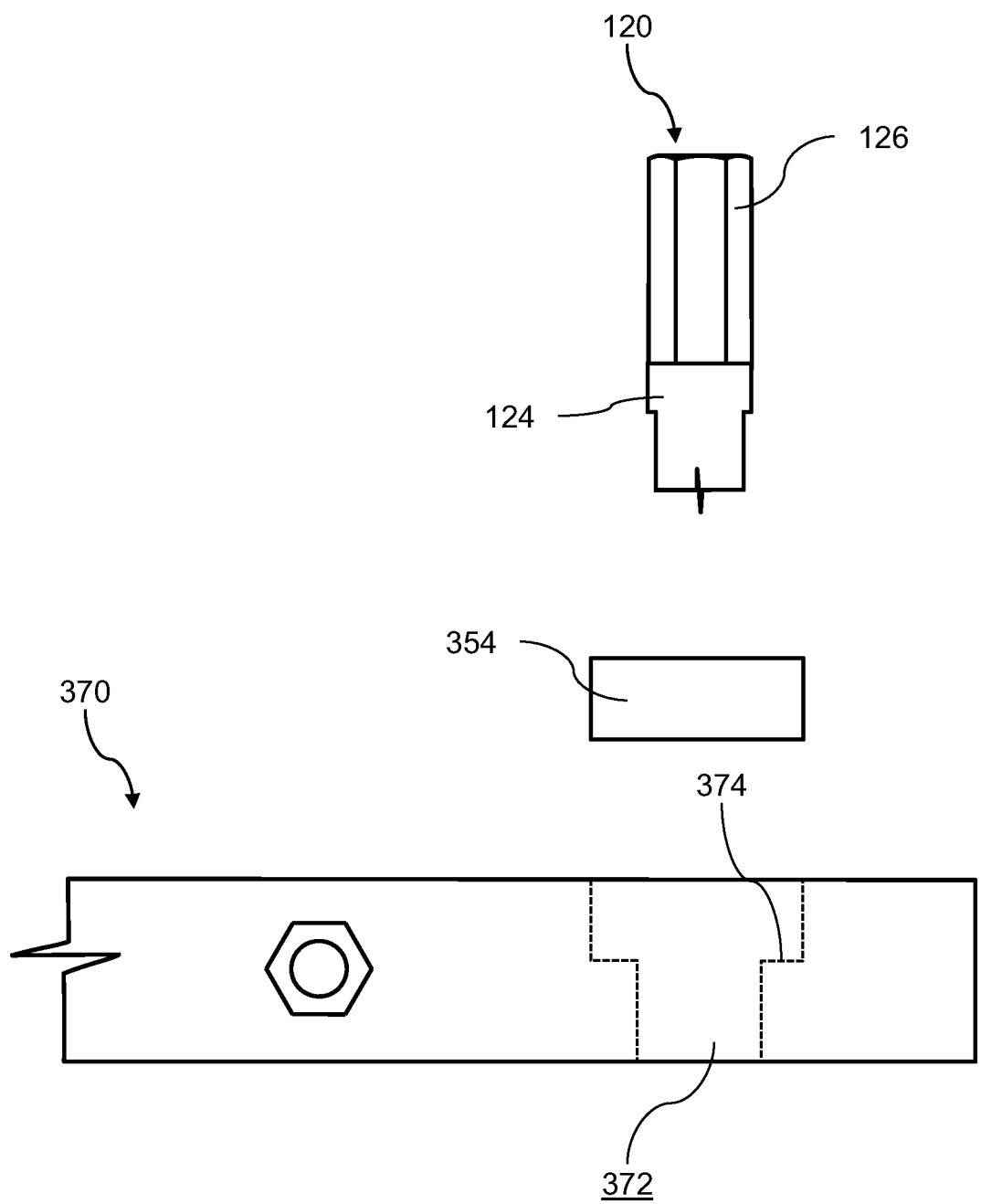
FIG. 3C is a side view illustration of a single-piece yoke having a journal cutout sized and shaped to receive a circular ball bearing, in accordance with the first exemplary embodiment of the present disclosure.
Figure 3D:
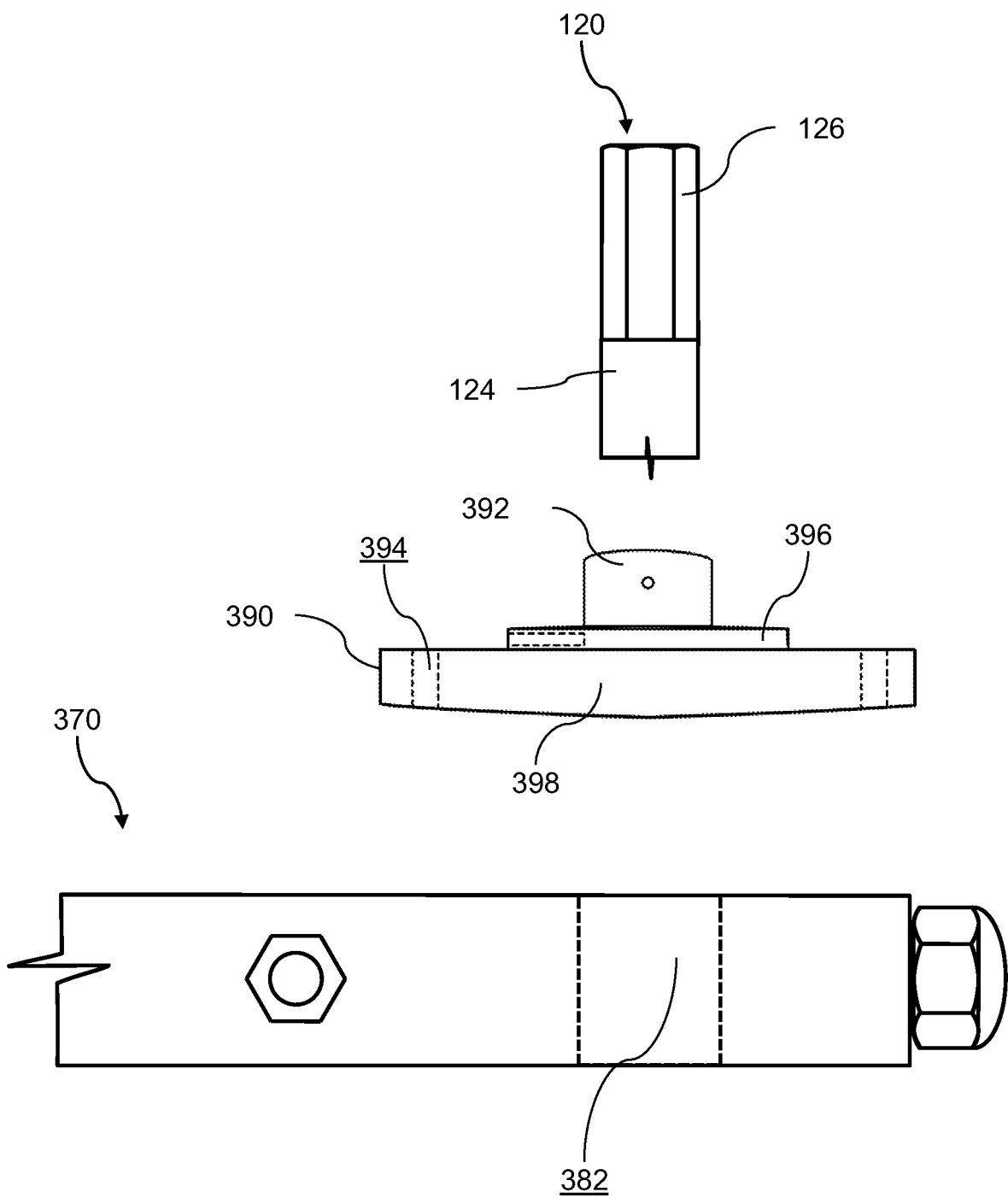
FIG. 3D is a side view illustration of the single-piece yoke having a journal cutout sized and shaped to receive an external flange bearing, in accordance with the first exemplary embodiment of the present disclosure.

It should be understood that any number of circular ball bearings may be used to secure the valve stem 120 to the yoke 130, and that any suitable method of retaining the circular ball bearings inside of the yoke 130 may be used herein. In one example, this may include pressing the bearings into a shaft or heating the bearings and attaching them to the shaft, then pressing the shaft into the yoke 130. Once the bearings are secured to the yoke 130, plates may be installed over the bearings to prevented them from being dislodged and to deter unwanted debris. FIGS. 3B-3D are illustrated as exploded side view drawings. In operation, all of the components will be placed together and/or received within one another as described herein. For ease of illustration, the journaled portion 124 of the valve stem 120 is only partially shown.

FIG. 3B is a side view illustration of yoke 130 having a journal cutout 360 sized and shaped to receive a flanged ball bearing 350. As shown in FIG. 3B, the yoke 130 may include a fixed portion 132 and a removable portion 134. A journal cutout 360, which may comprise two volumes of material removed from each of the fixed portion 132 and the removable portion 134, may be located in the same position as the journal cutouts 332, 334 of FIG. 3A, above. Since FIG. 3B shows the yoke 130 in an assembled state, the journal cutout 360 herein is referred to as a single cutout, rather than two halves of a cutout. However, it should be understood that each of the yoke pieces 132, 134 may have a volume of material which has been removed, and which forms a desired volume when assembled together. In the case of FIG. 3B, the volume of material removed may correspond to a flanged ball bearing 350; i.e., the journal cutout 360 may be sized and shaped to receive and hold a flanged ball bearing 350 for operation therein. In one example, the journal cutout 360 may include one or more horizontal lips 362 corresponding with flanges 352 extending horizontally and radially away from the center of the flanged ball bearing 350. The lips 362 may provide a shelf upon which the flanged ball bearing 350 may rest and may maintain its vertical position in operation within the yoke 130. In one example, the flange or flanges 352 may have a diameter greater than an interior diameter of a portion of the journal cutout 360 to allow this fit. The flanged ball bearing 350 may include any type and number of suitable flanged ball bearings, having any suitable diameter, length, thickness, number and type of bearings, and the like. The flanges 352 may extend from one or more portions of the flanged ball bearing 350, depending on the design. The valve stem 120 may be sized and shaped to extend through a central hole (not shown in this view) in the flanged ball bearing 350 such that the valve stem 130 may be positioned through the flanged ball bearing 350 and the yoke 130 in operation. Specifically, when the removable portion 134 of the yoke 130 is separated from the fixed portion 132, the valve stem 120 may be positioned through the flanged ball bearing 350; the valve stem 120 and flanged ball bearing 350 together may be placed within the journal cutout 360; and the removable portion 134 of the yoke 130 may be placed together with the fixed portion 132. In operation, the valve stem 120 may rotate within the flanged ball bearing 350 as the flanged ball bearing 350 maintains the vertical position of the valve stem 120 within the yoke 130. In one example, the journaled portion 124 of the valve stem 120 may be the portion of the valve stem 120 positioned within the central hole in the flanged ball bearing 350.

With respect to any of the examples described relative to FIGS. 3B-3D, in one example, a portion of the valve stem 120 may have a diameter equal to or greater than the central hole of the bearing 350, 354, 390 so that the valve stem 120 may maintain a friction fit with the bearings 350, 354, 390. For instance, this may include a tapering of the journaled portion 124 of the valve stem 120 such that an upper portion of the journaled portion 124 has a diameter equal to or greater than the central hole, and a lower portion of the journaled portion 124 has a diameter less than the central hole. In another example, this may include a step change in diameter. In another example, the entire diameter of the journaled portion 124 may be equal to the diameter of the central hole. The tapering, stepped, and constant diameter examples are shown in FIGS. 3B-3D, and one of skill in the art will understand how all of these examples are used in implementation.

The journal cutout 370 of the yoke 130 may be created in any suitable manner, including machining, forming, punching, forging, and the like.

FIG. 3C is a side view illustration of a single-piece yoke 370 having a journal cutout 372 sized and shaped to receive a circular ball bearing 354, in accordance with the first exemplary embodiment of the present disclosure. In the example shown in FIG. 3C, the single-piece yoke 370 is a unitary yoke that does not have removable portions as shown above. Within the yoke 370, at the same position described relative to FIGS. 3A-3B, may be journal cutout 372. The journal cutout 372 may be a generally cylindrical volume of removed material having at least two different internal diameters. The volume of material removed within the first diameter may correspond with a circular ball bearing 354, which may have a cylindrical or puck shape generally. The volume of material removed within the second diameter may correspond to a portion of the valve stem 120, including particularly the journaled portion 124. In other words, the journal cutout 372 may be sized and shaped to receive a circular ball bearing and a portion of a valve stem 120 within the journal cutout 372. The circular ball bearing 354 may include any suitable type of circular ball bearings, and may include a central hole (not shown in this view) through which the valve stem 120 may be positioned. In operation, the circular ball bearing 354 may be placed within the journal cutout 372. The circular ball bearing 354 may rest against a lip 374 or ledge created by the difference between the first and second diameters. In this manner, the first diameter may be greater than the second diameter in order to create the lip 374. The valve stem 120 may be positioned through the central hole of the circular ball bearing 354 until it maintains a vertical position against the circular ball bearing 354. The valve stem 120 may then be rotated as described herein while maintaining the vertical position of the valve stem 120.

FIG. 3D is a side view illustration of the single-piece yoke 370 having a journal cutout 382 sized and shaped to receive an external flange bearing 390, in accordance with the first exemplary embodiment of the present disclosure. In the example shown in FIG. 3D, the journal cutout 382 may be a cylindrical volume of material removed from the singular piece of the yoke 370 at the same location and position as described relative to FIGS. 3A-3C, above. In one example, the cylinder shape of the journal cutout 382 may have a constant diameter throughout the entire yoke 372. This diameter may correspond to a portion of the valve stem 120, for instance, the journaled portion 124 of the valve stem 120. The external flange bearing 390 may not be received within the journal cutout 382, or may be received only partially within the journal cutout 382 in one example. For instance, the external flange bearing 390 may be positioned on a top surface of the yoke 372 and may be secured to the yoke using any suitable fastening method. In one example, bolts may be attached through bolt holes 394 within a base 398 of the external flange bearing 390 and into the yoke 372 itself. These are only partially illustrated for simplicity in the drawing, but can be understood with reference to FIG. 3A, for example. In one example, a lower portion of the external flange bearing 390 may be sized to fit within a portion of the journal cutout 382 to stabilize the external flange bearing 390 on the yoke 372. The external flange bearing 390 may include any suitable type of external flange bearings with components necessary for providing rotational motion and securing the valve stem therein. For instance, the external flange bearing 390 may include a bushing 392 containing a screw or bolt against which the valve stem 120 may be secured. The bushing 392 and valve stem 120 may be placed within the bearings 396, having a central hole therethrough (not shown in this view), which may allow the valve stem 120 to rotate within the external flange bearing 390 while maintaining the vertical position of the valve stem 120.

It should be understood that the posts 136 and fasteners 138 illustrated and described relative to FIG. 2, above, may be used in operation with any of the yoke embodiments illustrated relative to FIGS. 3A-3D.

Figure 4A:
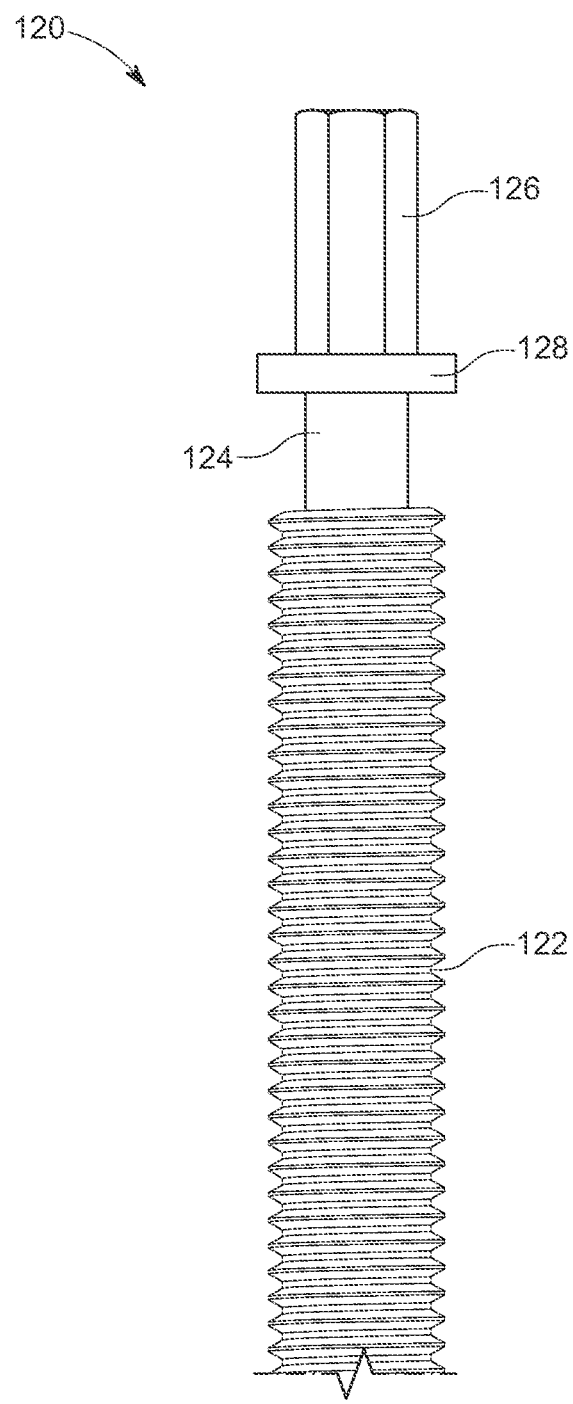
FIG. 4A is a side view illustration of the valve stem of the knife gate valve, in accordance with the first exemplary embodiment of the present disclosure.

FIG. 4A is a side view illustration of the valve stem 120 of the knife gate valve 100, in accordance with the first exemplary embodiment of the present disclosure. The valve stem 120 may include a threaded portion 122, a journaled portion 124, and a head portion 126 having a lip 128. As shown in FIG. 4A, a diameter of the journaled portion 124 is smaller than a diameter of the threaded portion 122. The diameter of the lip 128 may be larger than the diameter of the journaled portion 124. This may allow the journaled portion 124 to be placed within the journal cutouts 332, 334 of the yoke 130 shown in FIG. 3, and may allow the valve stem 120 to be maintained at a constant vertical position while in operation.

In one example, the diameter of the lip 128 may be larger than a diameter of the threaded portion 122. In another example, the diameter of the lip 128 may be larger than the diameter of the portion of the head portion 126 that can interface with a hexagonal socket.

In one example, the valve stem 120 may be used with any suitable valve type and retaining or sealing arrangement. For instance, the valve stem 120 may be used with a gate valve such as a wedge valve having a bonnet and wiper ring retaining system. In another example, the valve stem 120 may be used with a globe valve or pinch valve having a bonnet and stem retaining system. The valve stem 120 may enable these types of valves to be operated manually or using a power rotational tool, with a socket or directly mated, as shown below.

Figure 4B:
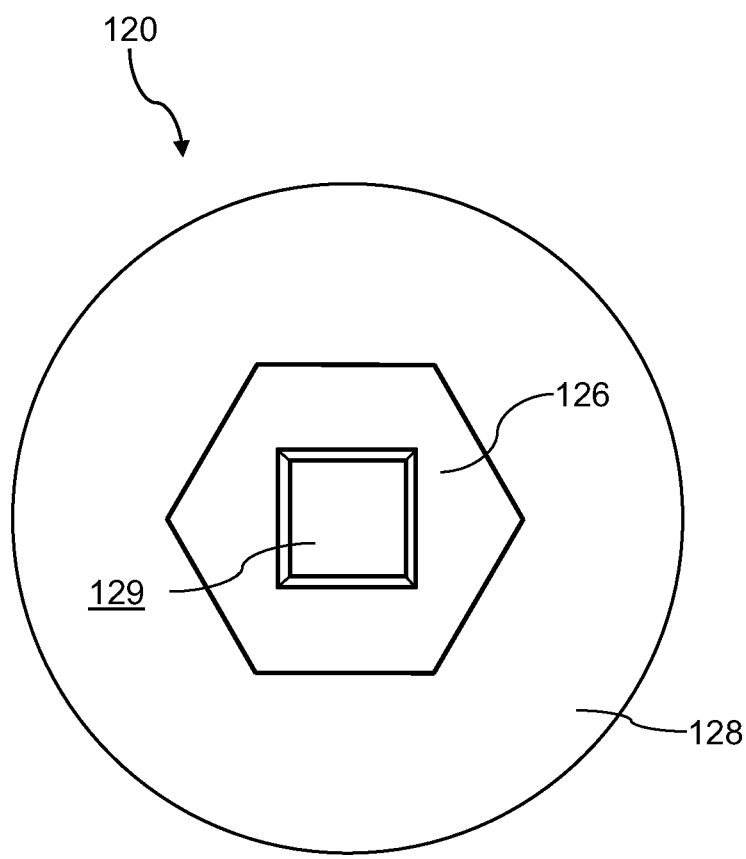
FIG. 4B is a top view illustration of the valve stem of the knife gate valve, in accordance with the first exemplary embodiment of the present disclosure.

FIG. 4B is a top view illustration of the valve stem 120 of the knife gate valve 100, in accordance with the first exemplary embodiment of the present disclosure. In one example, the head portion 126 may include a cut-out 129 through the top of the head portion 126 and extending along a portion of the length of the valve stem 120. The cut-out 129 may be formed by machining, such as by broaching, or by other processes such as casting. The cut-out 129 may be sized and shaped to allow direct mating of a powered rotational tool to the head portion 126 without the need for sockets or other mating hardware. In one example, the cut-out 129 may have a square shape to mate with a powered impact driver. In another example, the shape and depth of the cut-out 129 may be different to mate with other tools or devices. For instance, the cut-out 129 may be shaped as a hexagonal, Torx, cross, or other shape.

Operating Example

An operating example of the knife gate valve 100 is described with reference to FIGS. 1-4B. To assemble the knife gate valve 100, the pipe 10 may be assembled along with the valve body 20. The posts 136 may be fed through and/or threaded through the fixed portion 132 of the yoke 130. The posts 136 may be attached to the valve body 20 and fastened with the fixed portion 132. The valve stem 120 may be connected with the shutoff apparatus 110, for instance, by threading the shutoff apparatus 110 into the threaded portion 122 of the valve stem 120. The shutoff apparatus 110 and the valve stem 120 may be positioned within the valve body 20 with the valve stem 120 oriented orthogonal to the direction of flow within the pipe 10. The journaled portion 124 of the valve stem 120 may be positioned within the volume of the journal cutout 332 of the fixed portion 132. The removable portion 134 of the yolk 130 may be secured to the fixed portion 132 by positioning the removable portion 134 along the adjoining edge 322 and inserting and tightening the bolts 336 through the fixed and removable portions 132, 134. The journaled portion 124 may be positioned within the journal cutouts 332, 334.

Figure 11A:
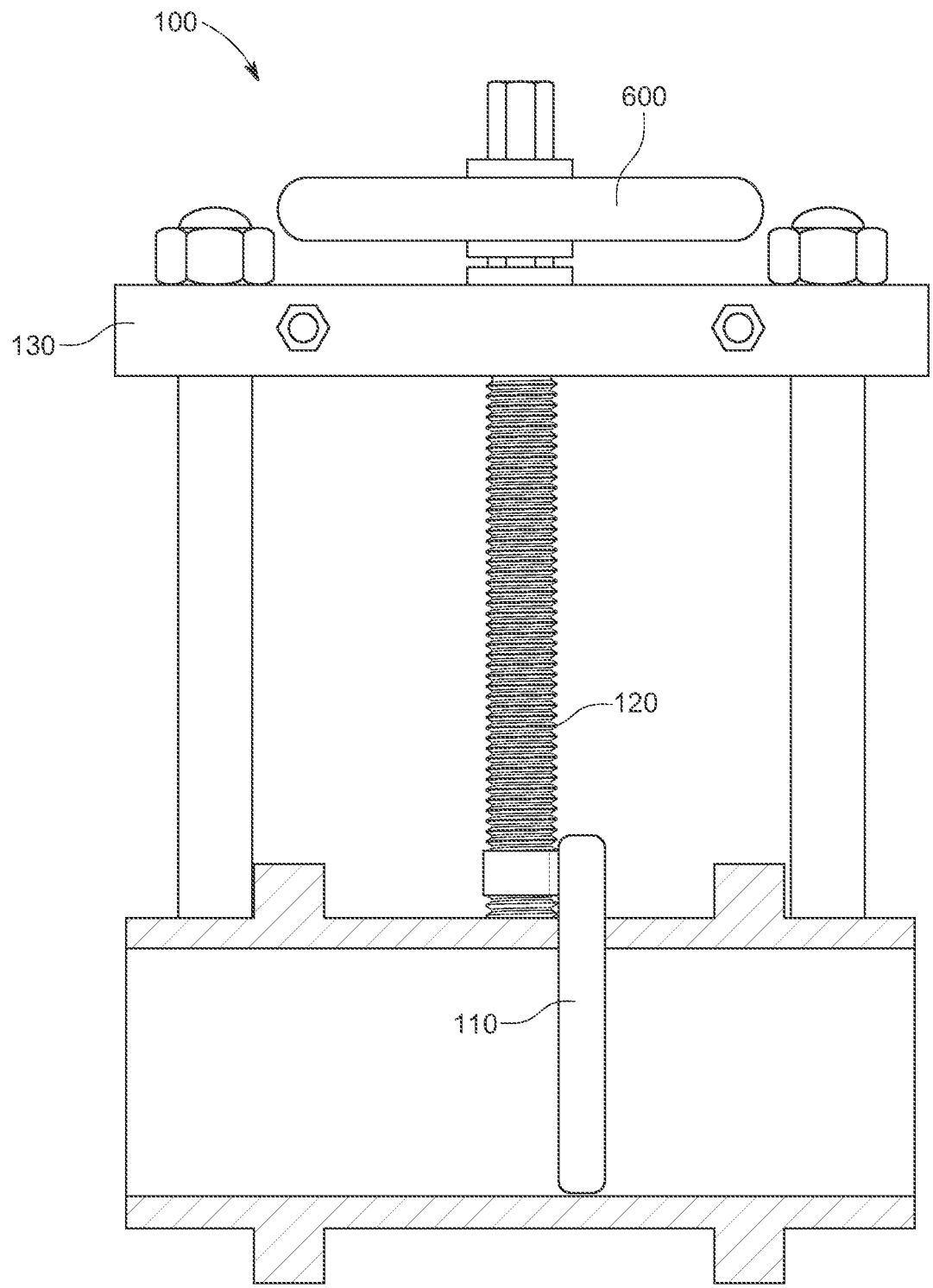
FIGS. 11A-11B are side view illustrations of the knife gate valve in operation, in accordance with the second exemplary embodiment of the present disclosure.
Figure 11B:
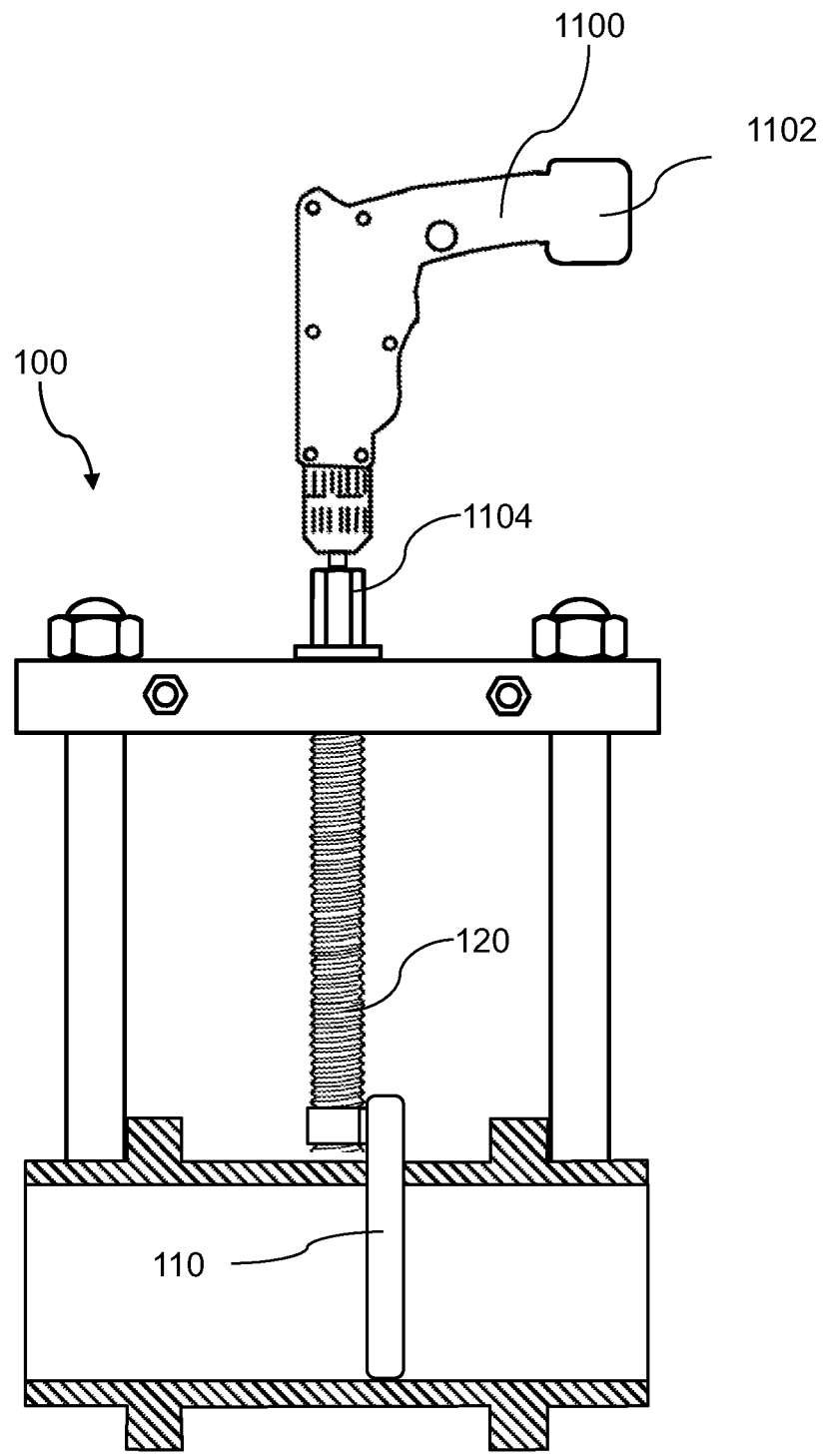

In operation, a powered rotational tool with a compatible socket may be mated with the head portion 126 of the valve stem 120, as shown in FIG. 11B. The powered rotational tool may be driven in one direction, causing the valve stem 120 to rotate within the yoke 130, and driving the shutoff apparatus 110 out of the valve body 20 by the movement of the internal threading 112 against the threaded portion 122. The vertical position of the valve stem 120 may be maintained by the lip 128, which may press against and rotate against the fixed portion 132 while the valve stem 120 is being driven. The powered rotational tool may be driven in the opposite direction, causing the valve stem 120 to rotate within the yoke 130, and driving the shutoff apparatus 110 back into the valve body 20 by the movement of the internal threading 112 against the threaded portion 122. This operational process may be performed a number of times and to the extent desired by the operator. For instance, the shutoff apparatus 110 may be opened or closed as often as desired, and the extent of opening or closing may be determined by the operator as desired.

It should be understood that the relative directions and orientations described herein, such as "vertical", "above", "below", "left", "right", and the like may be applied relative to any actual orientation of the components in operation. Accordingly, the shutoff apparatus 110, valve stem 120, and yoke 130 may be oriented vertically, horizontally, or at any angle, and the relative directions and orientations may be applied accordingly. The directional descriptions should not be understood to limit the invention to any particular orientation, and are illustrative only.

Figure 5:
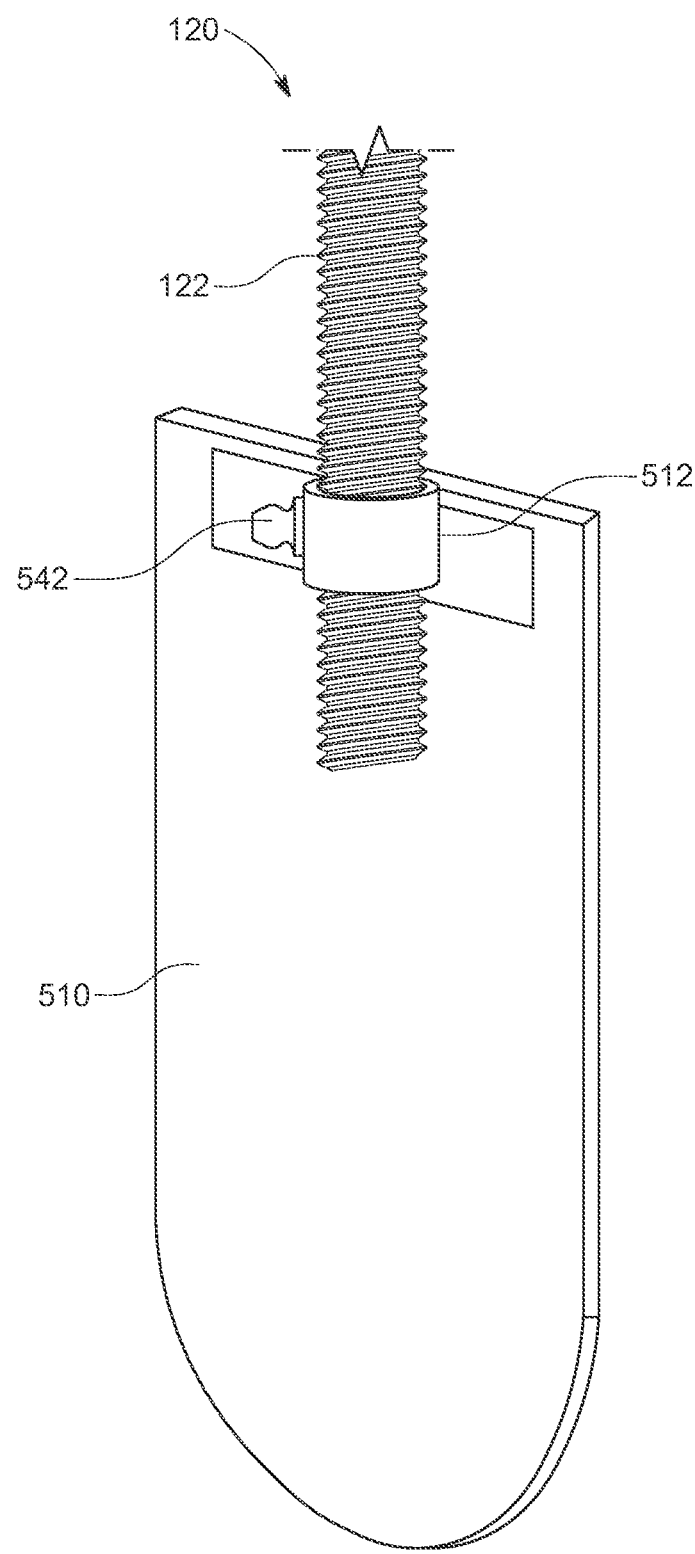
FIG. 5 is a diagrammatic illustration of a knife gate in use with the knife gate valve, in accordance with the first exemplary embodiment of the present disclosure.

FIG. 5 is a diagrammatic illustration of a knife gate 510 in use with the knife gate valve 100, in accordance with the first exemplary embodiment of the present disclosure. FIG. 5 may be understood with reference to FIGS. 1-4B, above. The knife gate 510 may be a thinner gate than a wedge shutoff apparatus, and may have a substantially planar shape. The knife gate 510 may be positioned orthogonal to a directional flow of the pipe 10 such that the planar surface of the knife gate 510 opposes the flow when the knife gate 510 is in the flow path. The knife gate 510 may attach to the threaded portion 122 of the valve stem 120 by way of an internally-threaded attachment 512, which may be located on an exterior side of a top portion of the knife gate 510. The knife gate 510 may be driven according to the operating example described above.

In one example, the internally-threaded attachment 512 may include a grease insert 542 or grease zerk to allow lubricant to be fed into the internally-threaded attachment 512 to lubricate the threaded portion 122 in operation. The grease insert 542 may be any suitable type and number of inserts at any desired location on the internally-threaded attachment 512.

Figure 6:
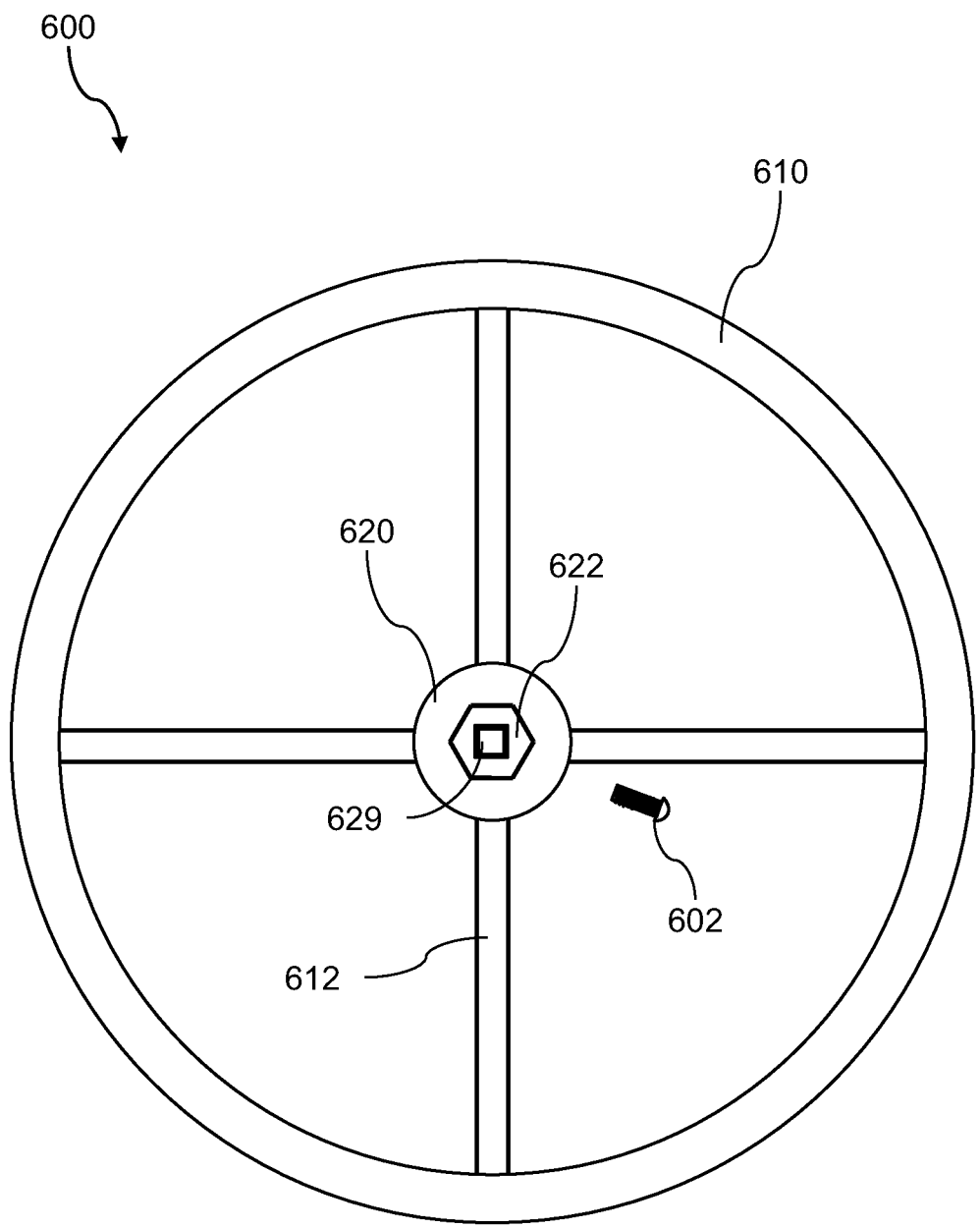
FIG. 6 is a top view illustration of a handwheel, in accordance with a second exemplary embodiment of the present disclosure.

FIG. 6 is a top view illustration of a handwheel 600, in accordance with a second exemplary embodiment of the present disclosure. The handwheel 600 may include an outer handle 610 and a center plate 620 having a bottom portion (shown in FIG. 7) and a top portion 622. The bottom portion is sized and shaped to engage with a shaft or valve stem. The top portion 622 is sized and shaped to engage with a rotational socket. Rotational sockets may include hexagonal, 12-point, spline, Torx, and similar socket shapes. For ease of illustration, FIGS. 6-11B show a hexagonal rotational shape.

The outer handle 610 may have any suitable size and shape for manual operation with a valve stem. In one example, the shape of the outer handle 610 may be a wheel having circular, elliptical, or similar shapes. In another example, the outer handle 610 may include levers, arms, multiple arm configurations, knob and wheel configurations, and similar elongate-member elements extending from the center plate 620. For ease of illustration, a circular wheel embodiment is illustrated in FIGS. 6-11A. However, it should be understood that the other handle embodiments described herein are included within the scope of this disclosure. In one example, a diameter of the outer handle 610 may be smaller than a human arm span to allow an operator to manually engage the outer handle. The outer handle 610 may be sized to allow a human hand to grip any portion of the outer handle 610 in operation.

The center plate 620 may be smaller in diameter than the outer handle 610. The top portion 622 may be a volume arising out of the center plate 620 and shaped to engage with a rotational socket. This is shown in side view in FIG. 9, below. In practice, the top portion 622 may be a hexagonal or other-shaped extrusion or member extending above the center plate 620. In one example, the top portion 622 may be manufactured integral with the center plate 620. In another example, the top portion 622 may be affixed to the center plate 620 by welding, adhesive, mechanical fixture, or other method.

In one example, the outer handle 610 may be formed integral with or affixed to the center plate 620, as in the case of knob-and-wheel configurations, levers, arms, and the like. In another example, a plurality of wheel arms 612 or spokes may extend between the outer handle 610 and the center plate 620. The wheel arms 612 may be lengthwise members that provide structural support for the outer handle 610 when it is being operated to turn the handwheel 600 and the valve stem. In one example, the wheel arms 612 may be formed integral with the outer handle 610 and the center plate 620. In another example, the wheel arms 612 may be fixed to the outer handle 610 and center plate 620 by welding, adhesive, mechanical fixture, or the like. In the example shown in FIG. 6, four wheel arms 612 are present and are equally-spaced radially about the center plate 620. However, any suitable number and distribution of wheel arms 612 may be used. For instance, six wheel arms 612 may be used at even spacing about the center plate 620. In another example, four wheel arms 612 may be used, but with some of the arms positioned more closely to one another than to others. In one example, the wheel arms 612 may be essentially planar or cylindrical, having a straight length between the outer handle 610 and the center plate 620. In another example, the wheel arms 612 may extend in a curved or non-linear manner between the outer handle 610 and the center plate 620. For instance, the outer handle 610 may be positioned at a distance above the center plate 620 to make the outer handle 610 more easily accessible, and the wheel arms 612 may curve or bend from the outer handle 610 to reach the center plate 620. In another example, the width of the wheel arms 612 may vary across the length of the wheel arms 612. For instance, the wheel arms 612 may be wider at the outer handle 610 and thinner at the center plate 620. In another example, the width of the wheel arms 612 may be constant, as shown in FIG. 6.

The outer handle 610, center plate 620, and wheel arms 612 may be formed from any suitable materials. In one example, all of the components 610, 620, 612 may be formed from metal, such as steel, galvanized steel, iron, and the like. In another example, all of the components 610, 620, 612 may be formed or cast integral with one another, i.e., manufactured as a single, monolithic piece. In another example, one or more of the components 610, 620, 612 may be manufactured separately from the others. Any one or more of the components 610, 620, 612 may include coatings or other materials to improve grip (friction), reduce strain on the user's hands, repel dirt and other materials, and the like.

Figure 10:
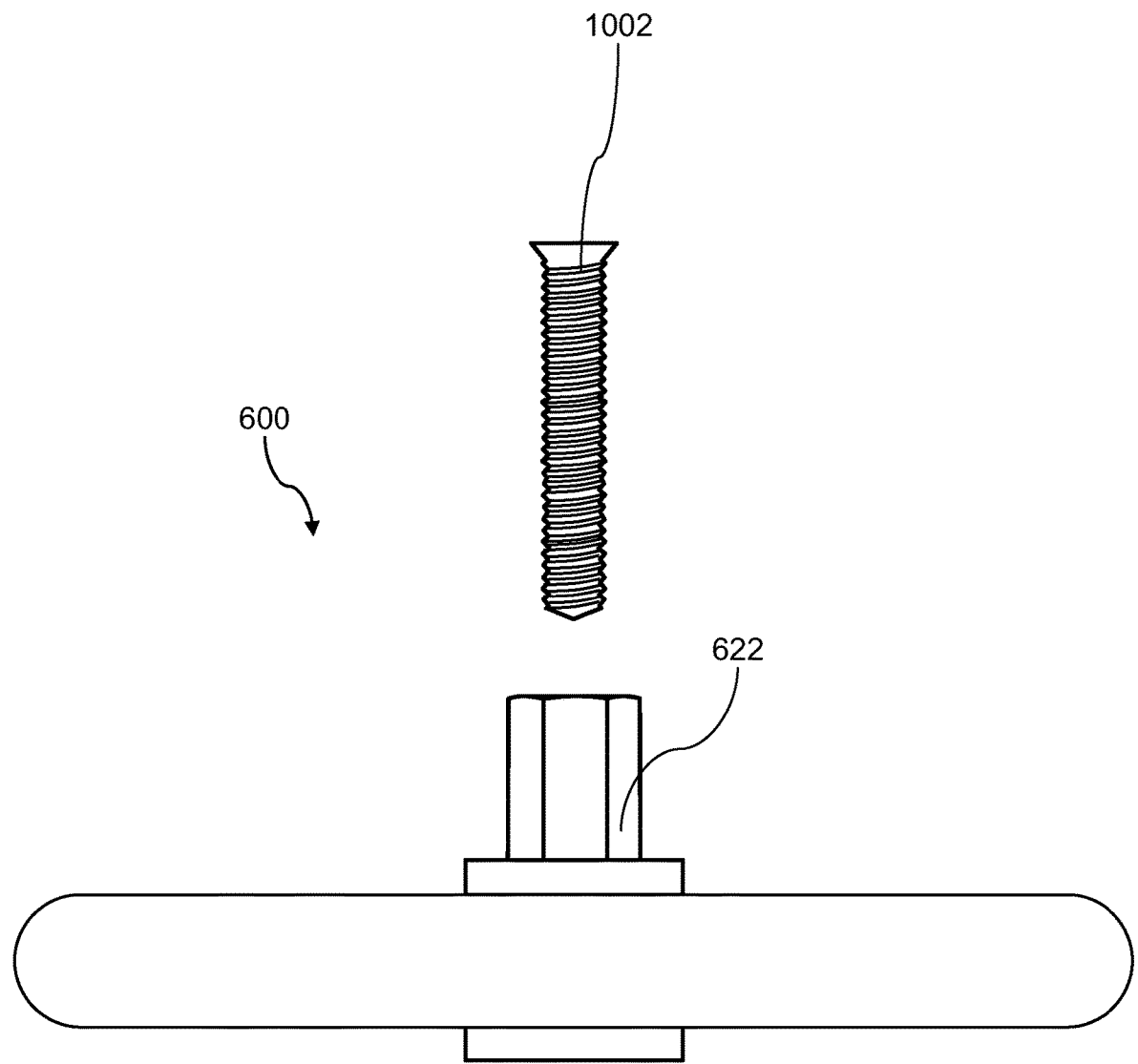
FIG. 10 is a side view illustration of the handwheel with a bolt, in accordance with the second exemplary embodiment of the present disclosure.

A fastener 602 may be used to fasten the handwheel 600 to the valve stem in operation. The fastener 602 may be any suitable mechanical fastener, such as a screw, bolt, pin, cotter, rivet, and the like. In the example illustrated in FIG. 6, a threaded screw 602 is shown. The screw 602 may be inserted into a threaded hole within the bottom portion to secure the handwheel 600 against the valve stem. An alternative example is illustrated in FIG. 10, showing a screw threaded into the top portion 622 to secure the handwheel 600 against the valve stem.

The top portion 622 may extend above the center plate 620 at a length sufficient to allow a powered rotational tool such as an impact driver to engage with the top portion 622. In operation, the powered rotational tool may be powered to drive the handwheel 600 rotationally in one direction or another, thereby turning the handwheel through powered operation. A user may operate the handwheel 600 manually or with a powered rotational tool as desired.

In one example, the top portion 622 may include a cut-out 629 through the top of the top portion 622 and extending along a portion of the length of the top portion. The cut-out 629 may be sized and shaped to allow direct mating of a powered rotational tool to the top portion 622 without the need for sockets or other mating hardware. The cut-out 629 may be made as described relative to the cut-out 129 in FIG. 4B, above.

Figure 7:
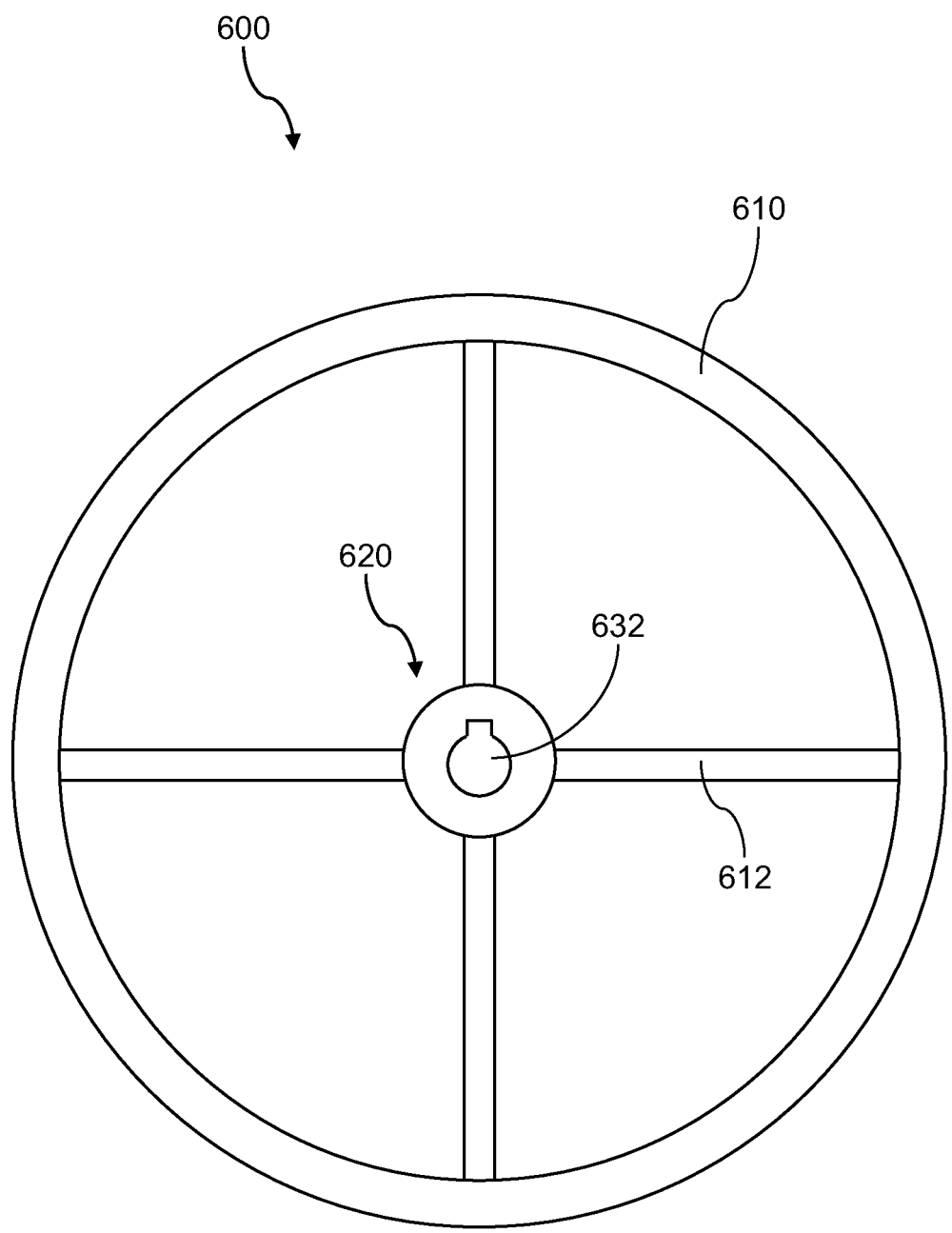
FIG. 7 is a bottom view illustration of the handwheel, in accordance with the second exemplary embodiment of the present disclosure.

FIG. 7 is a bottom view illustration of the handwheel 600, in accordance with the second exemplary embodiment of the present disclosure. The handwheel 600 is shown having the outer handle 610, center plate 620, wheel arms 612, and bottom portion 632. The bottom portion 632 is sized and shaped to engage with a shaft or a valve stem. The shape of the bottom portion 632 may be a socket having an open volume that may be placed over the valve stem. The shape may be any suitable shape for engaging with the valve stem. In the example shown in FIG. 7, this may include a round shape with a keyway slot to align the handwheel 600 and the valve stem. At least a portion of the valve stem may have a shape corresponding to the bottom portion 632. In one example, the bottom portion 632 may extend below the top portion 622 of the center plate 620. In other words, the socket and open volume may extend at least partially below the outer handle 610, the wheel arms 612, or the center plate 620. In another example, the socket and open volume may extend up through the bottom portion 632 toward the top portion 622.

Figure 8A:
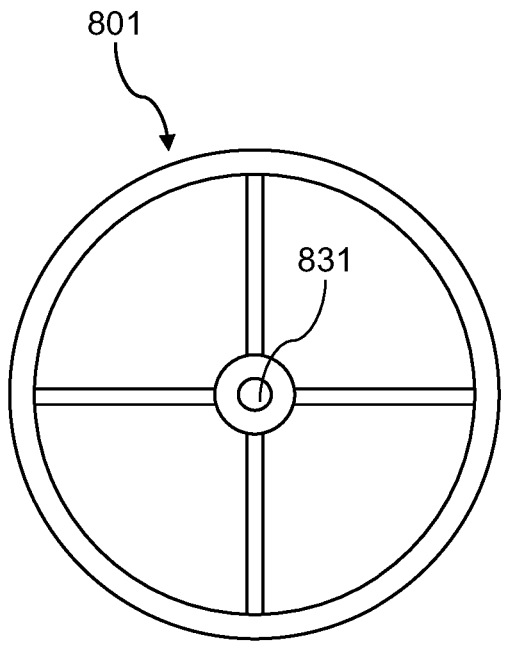
FIGS. 8A-8C are bottom view illustrations of alternative bottom portion shapes, in accordance with the second exemplary embodiment of the present disclosure.
Figure 8B:
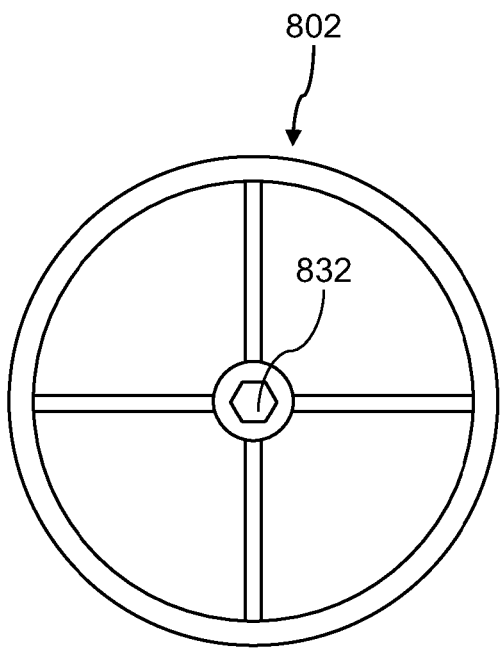
Figure 8C:
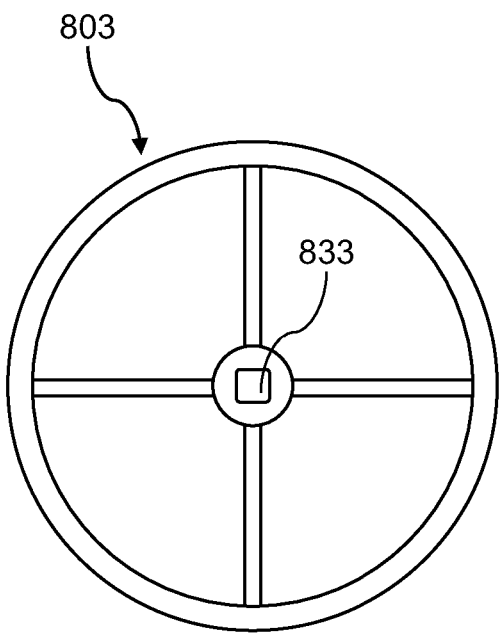

FIGS. 8A-8C are bottom view illustrations of alternative bottom portion shapes, in accordance with the second exemplary embodiment of the present disclosure. FIG. 8A shows a handwheel 801 having a round-shaped socket 831 for engaging with a compatible valve stem. FIG. 8B shows a handwheel 802 having a hexagonal-shaped socket 832 for engaging with a compatible valve stem. FIG. 8C shows a handwheel 803 having a square-shaped socket 833 for engaging with a compatible valve stem. The examples shown in FIGS. 7-8C are intended as examples only, and are not meant to limit the subject disclosure. Any other suitable shape, configuration, or combination thereof is included within the scope of this disclosure.

Figure 9:
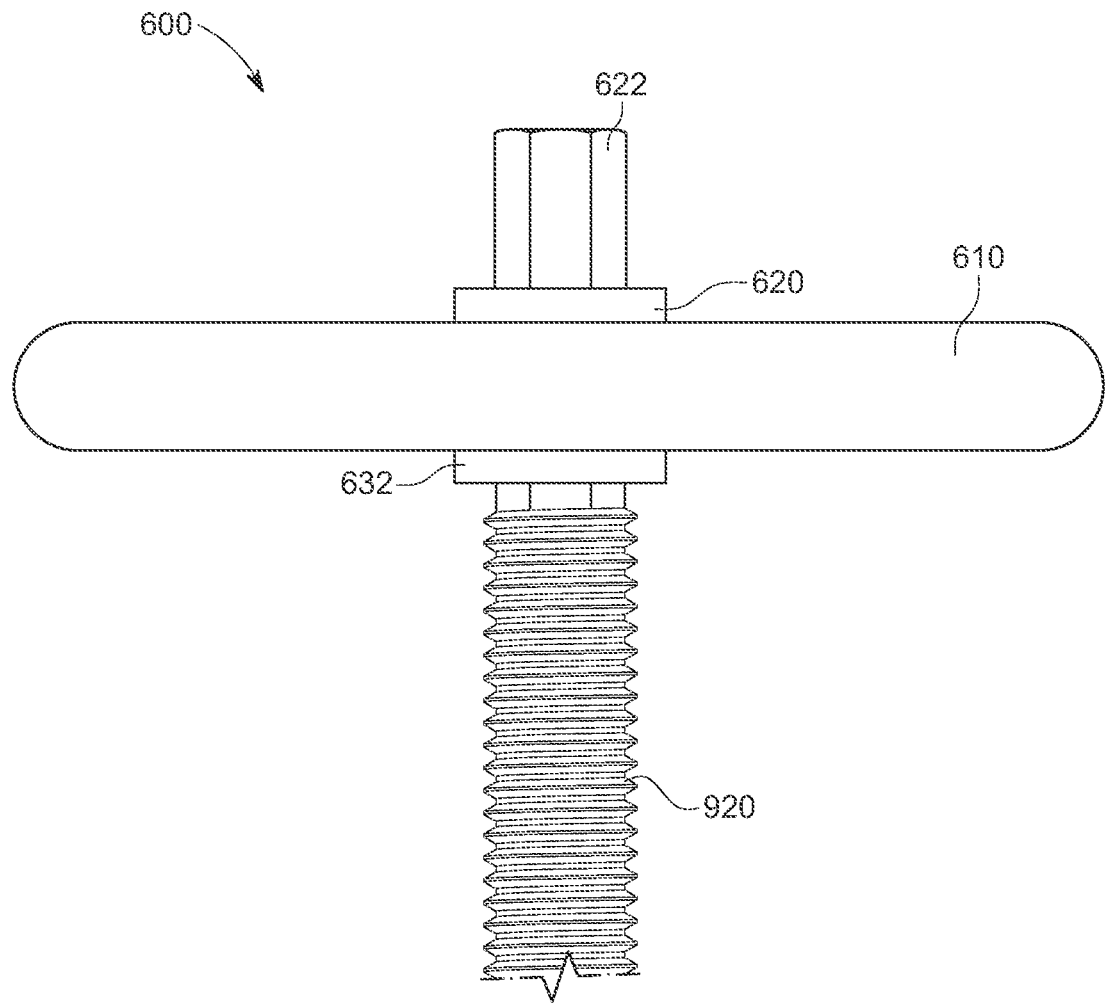
FIG. 9 is a side view illustration of the handwheel in operation with a valve stem, in accordance with the second exemplary embodiment of the present disclosure.

FIG. 9 is a side view illustration of the handwheel 600 in operation with a valve stem 920, in accordance with the second exemplary embodiment of the present disclosure. The outer handle 610 is shown about the center plate 620 having a top portion 622 and a bottom portion 632. As shown in FIG. 9, the bottom portion 632 is engaged with the valve stem 920 by the insertion of the head portion of the valve stem 920 within the socket of the bottom portion 632. The top portion 622 is oriented to allow engagement with a rotational socket.

FIG. 10 is a side view illustration of the handwheel 600 with a bolt 1002, in accordance with the second exemplary embodiment of the present disclosure. The bolt 1002 may have an external threading allowing it to engage with internal threading within the top portion 622 and, in some example, the valve stem 920 shown in FIG. 9. The threaded bolt 1002 may be inserted into the top portion 622 and tightened until the handwheel 600 is suitably fastened to the valve stem 920. This may secure the handwheel 600 in operation.

FIGS. 11A-11B are side view illustrations of the knife gate valve 100 in operation, in accordance with the second exemplary embodiment of the present disclosure. FIGS. 11A-11B may be understood with reference to FIGS. 1-10, above. For clarity of illustration, reference characters are not shown for every component illustrated, but may be understood to correspond to similar components shown in FIGS. 1-10.

FIG. 11A shows the knife gate valve 100 in operation with a handwheel. As an illustrative example, the handwheel shown is the handwheel 600 described relative to FIGS. 6-10. However, it may be understood that any suitable handwheel may be used with the knife gate valve 100. In operation, the knife gate valve 100 may be assembled on and within the pipe 10 as described above. The handwheel 600 may be placed over the head portion 126 of the valve stem 120, and may be secured to the valve stem 120 using a fastener 602. The handwheel 600 may be turned in one direction, causing the valve stem 120 to rotate in place and while maintaining its vertical position, thereby causing the shutoff apparatus 110 to raise. The handwheel 600 may be turned in the opposite direction, causing the valve stem 120 to rotate in place and while maintaining its vertical position, thereby causing the shutoff apparatus 110 to lower.

As shown in FIG. 11A, the manual operation of the knife gate valve 100 does not preclude operation with a powered rotational tool. In the example shown, the top portion 622 of the handwheel 600 remains available to accept a socket attached to the end of such a tool. Thus, the knife gate valve 100 may be operated manually or by powered rotational tool when in use with a handwheel.

FIG. 11B shows the knife gate valve 100 in operation with a powered rotational tool 1100. The tool pictured is a cordless impact driver, which may be powered using a battery 1102 or other cordless energy source. This may allow the knife gate valve 100 to be operated without need for electrical outlets or localized power supplies; battery-powered rotational tools 1100 may be used in remote locations and away from fixed electrical sources. The powered rotational tool 1100 may be equipped with a socket 1104 sized and shaped to engage with the head portion 126 of the valve stem 120. The socket 1104 may be placed over and engage with the head portion 126, causing the valve stem 120 to rotate when the powered rotational tool 1100 is operated. In another example, the powered rotational tool 1100 may be directly engaged with the head portion 126 by mating with a cut-out 129 as described relative to FIG. 4B.

Figure 12:
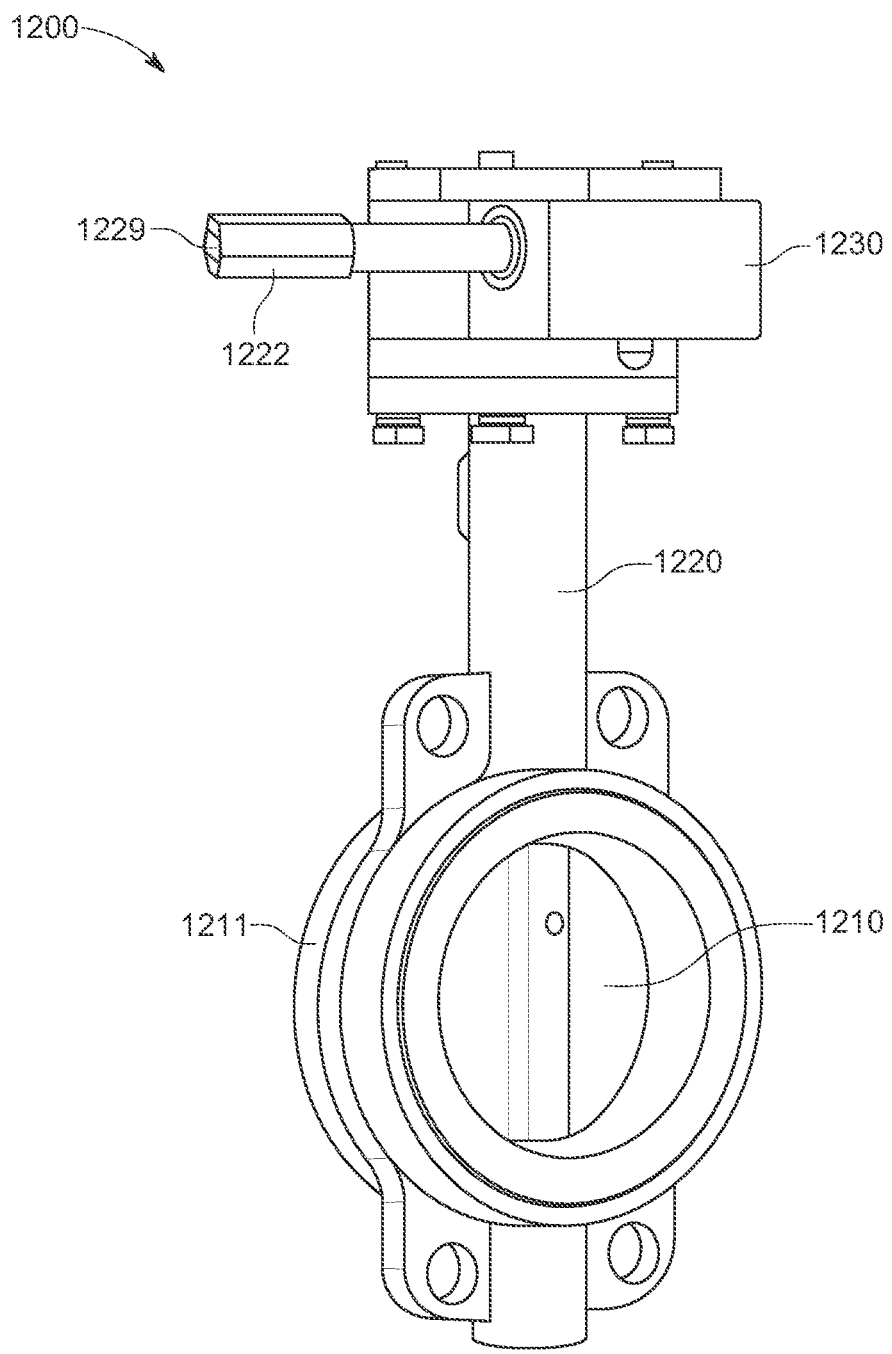
FIG. 12 is a diagrammatic illustration of a stemmed valve, in accordance with a third exemplary embodiment of the present disclosure.

FIG. 12 is a diagrammatic illustration of a stemmed valve apparatus 1200, in accordance with a third exemplary embodiment of the present disclosure. The stemmed valve apparatus 1200 may include a shutoff apparatus 1210 and a first valve stem 1220 in communication with the shutoff apparatus 1210. A rotational transfer system 1230 is in communication with the first valve stem 1220. A second valve stem 1222 is in communication with the rotational transfer system 1230. The second valve stem 1222 has an end sized to engage with a powered rotational tool. Rotation of the second valve stem 1222 within the rotational transfer system 1230 causes the first valve stem 1220 to rotate. The rotation of the first and second valve stems 1220, 1222 operates the shutoff apparatus 1210 to open and close.

A valve 1211 may include the shutoff apparatus 1210 and may be any suitable type of valve, including multi-turn and partial-turn valves. Multi-turn valves may include wedge gate, knife gate, plug, globe, pinch valves, and the like. Partial-turn valves may include butterfly valves, ball valves, and the like. As an example, FIG. 12 shows a butterfly valve. The shutoff apparatus 1210 may be in communication with a pipe 10 to control the flow of material through the pipe 10 as described relative to FIG. 1, above.

The first valve stem 1220 may be in communication with the shutoff apparatus 1210 in a manner suitable and known for the particular type of valve 1211. For instance, in the butterfly valve example shown in FIG. 12, the first valve stem 1220 may extend into the shutoff apparatus 1210 and may be secured by pins or other fasteners. The first valve stem 1220 may include a shaft extending between the shutoff apparatus 1210 and the rotational transfer system 1230.

The first valve stem 1220 may connect to the valve 1211 at a bottom portion of the valve stem 1220 (not shown). The bottom portion may be any suitable shape and style of connection to the valve 1211, including an internally threaded attachment, flanged connectors, locking cuffs, or any known method of connecting a valve 1211 to a valve stem 1220.

The rotational transfer system 1230 may be any system that transfers rotation about one axis to rotation about another axis, for instance, between two orthogonal axes. This may include gearboxes, bevel gear arrangements, and the like. As shown in FIG. 12, the rotational transfer system 1230 may be a gear box that transfers rotation about a horizontal axis to rotation about a vertical axis differentiated by about 90°. This may allow an operator to easily reach and/or operate the stemmed valve apparatus 1200 when placement, location, or available space are of concern. The rotational transfer system 1230 may include a housing to protect components therein. The rotational transfer system 1230 may transfer rotation between any two angles or axes.

The second valve stem 1222 may be a valve stem extending from within the rotational transfer system 1230. The connection between the first valve stem 1220, the rotational transfer system 1230 may allow the valve stems 1220, 1222 to rotate about their axes. In one example, each valve stem 1220, 1222 may terminate in a bevel gear in operational communication with one another within the rotational transfer system 1230. In another example, the rotational transfer system 1230 may include a system of gears to provide a mechanical advantage to the second valve stem 1222, thereby easing the operation of the shutoff apparatus 1210.

The exterior aspect of the second valve stem 1222 shown in FIG. 12 may include a shaped end. At least a portion of the second valve stem 1222 may be shaped as a hexagon, 12-point, spline, Torx, or similar shape. In one example, only an end portion may be shaped. In another example, a substantial length of the second valve stem 1222 may be shaped. In another example, an entire length of the second valve stem 1222 may be shaped. The shape may be sized to engage with a powered rotational tool. In one example, the shape of the second valve stem 1222 may engage with a corresponding socket attached to a powered drill or impact driver. This may allow the stemmed valve apparatus 1200 to be operated with corded or cordless powered rotational tools as described above.

In one example, the second valve stem 1222 may include a cut-out 1229 through the exterior aspect of the second valve stem 1222. The cut-out 1229 may be sized and shaped to allow direct mating of a powered rotational tool to the second valve stem 1222 without the need for sockets or other mating hardware. The cut-out 1229 may be made as described relative to the cut-out 129 in FIG. 4B, above.

The valve stems 1220, 1222 and the rotational transfer system 1230 may be made from any suitable materials, including metal, alloys, plastics, or any combination thereof.

In operation, a user may attach a powered rotational tool to the second valve stem 1222 by engaging the shaped end with a corresponding socket. The user may cause the powered rotational tool to rotate in one direction, which may in turn cause the second valve stem 1222 to rotate in the same direction. The rotational transfer system 1230 may direct the rotation to the first valve stem 1220 about a different axis. The rotation of the first valve stem 1220 may cause the shutoff apparatus 1210 to open or close in response.

In one example, the rotational transfer system 1230 may include components to limit the rotation of the first or second valve stems 1220, 1222 to a particular range of angles. For example, in partial-turn valves, the shutoff apparatus 1210 should not rotate beyond a point, such as 90°, or the valve will begin turning in the opposite direction.

Figure 13:
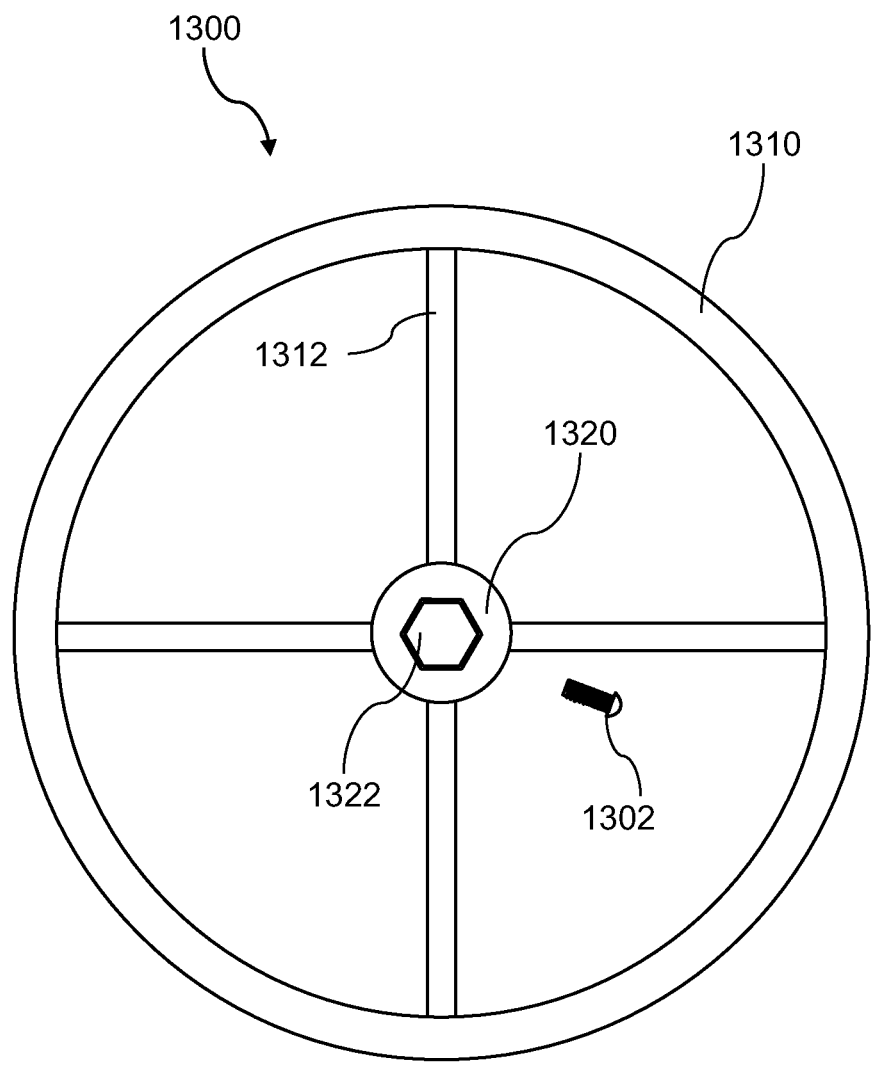
FIG. 13 is a diagrammatic illustration of a handwheel for use with the stemmed valve of FIG. 12, in accordance with the third exemplary embodiment of the present disclosure.

FIG. 13 is a diagrammatic illustration of a handwheel 1300 for use with the stemmed valve apparatus 1200 of FIG. 12, in accordance with the third exemplary embodiment of the present disclosure. The handwheel 1300 may have similar components to the handwheel 600 of FIGS. 6-10, above, including an outer handle 1310, a plurality of wheel arms 1312, center plate 1320, and fastener 1302. The handwheel 1300 may further include a shaped cutout 1322 extending completely through the center plate 1320. The shaped cutout 1322 may allow the handwheel 1300 to be inserted over the second valve stem 1222. The shaped cutout 1322 may be sized and shaped to fit over the second valve stem 1222 while allowing engagement of the handwheel 1300 with the stemmed valve apparatus 1200.

It should be understood that other handwheels may be used in manual operation with the stemmed valve apparatus 1200. This may include the handwheel 600 described in FIGS. 6-10. The handwheel 600 may be engaged over the second valve stem 1322 to turn the second valve stem 1222. The top portion 622 may allow a power rotational tool to operate the stemmed valve apparatus 1200 as desired.

Figure 14:
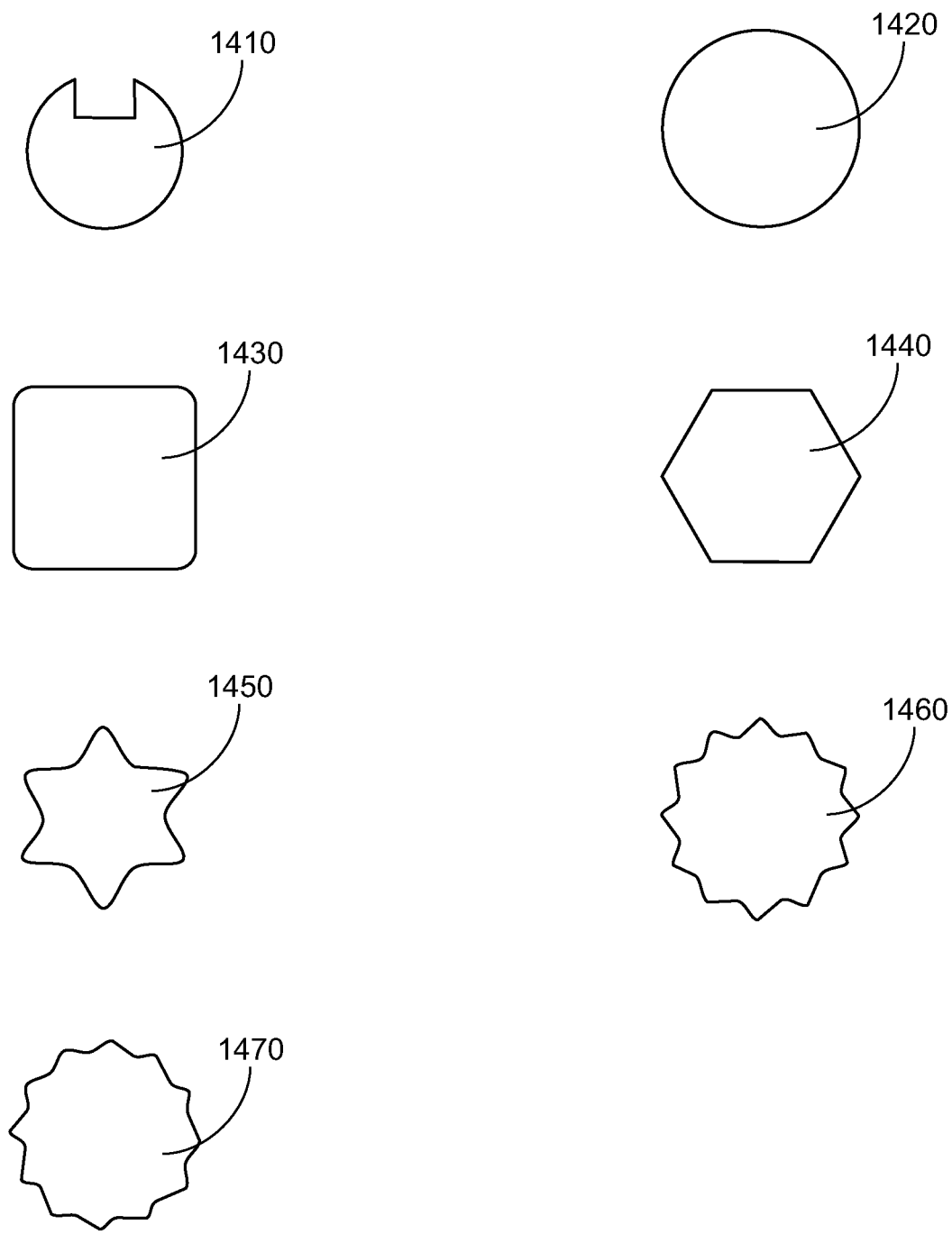
FIG. 14 is a diagrammatic illustration of exemplary valve stem head and socket shapes, in accordance with the first exemplary embodiment of the present disclosure.

FIG. 14 is a diagrammatic illustration of exemplary valve stem head and socket shapes, in accordance with the first exemplary embodiment of the present disclosure. The shapes illustrated in FIG. 14 may be used with any of the valve stem heads 126, 622, 1222 described relative to FIGS. 1-13, above. FIG. 14 is intended to provide illustrative examples, and is not intended to limit the disclosure to the subject shapes.

A slotted valve stem head 1410 or socket may include a rounded or circular portion as well as a slotted portion to align and prevent movement of connected parts. A round valve stem head 1420 or socket may include a circular-shaped portion. A square valve stem head 1430 or socket may include quadrilateral shapes having right angles. A hexagonal valve stem head 1440 or socket may include an equilateral hexagonal shape. A Torx valve stem head 14450 or socket may include a six-pointed star shape. A spline valve stem head 1460 or socket may include a number of radially-spaced teeth extending outward from a central point. And a 12-point valve stem head 1470 or socket may include 12 teeth extending outward from a central point.

It should be emphasized that the above-described embodiments of the present disclosure, particularly, any "preferred" embodiments, are merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A knife gate valve, comprising:
   a shutoff apparatus;
   a valve stem in communication with the shutoff apparatus, the valve stem comprising:
   a threaded portion,
   a journaled portion above the threaded portion, the journaled portion having a diameter smaller than a diameter of the threaded portion, and
   a head portion sized and shaped to engage with a powered rotational tool; and
   a yoke having a fixed portion and a removable portion secured along a common horizontal plane, the yoke having a journal cutout through the fixed portion and the removable portion through which the journaled portion of the valve stem is positioned, wherein a vertical position of the valve stem is maintained by the yoke, and wherein the valve stem is rotatable within the yoke to operate the shutoff apparatus.

2. The knife gate valve of claim 1, wherein the head portion of the valve stem has a lip, wherein a diameter of the lip is greater than the diameter of the journaled portion and the diameter of the journal cutout, and wherein the vertical position of the valve stem is maintained by the lip against the yoke.

3. The knife gate valve of claim 1, wherein the head portion of the valve stem is shaped as one from the set of slotted, round, square, hexagonal, 12-point, spline, and Torx heads.

4. The knife gate valve of claim 1, wherein the journal cutout is sized and shaped to receive a flanged ball bearing therein, and wherein the valve stem is rotatably positioned vertically through the flanged ball bearing within the journal cutout.

5. The knife gate valve of claim 1, wherein the journal cutout is sized and shaped to receive two semi-circular bearing halves therein, and wherein the journaled portion of the valve stem is rotatably positioned through the semi-circular bearing halves.

6. The knife gate valve of claim 1, wherein at least a portion of the journal cutout is sized and shaped to receive a circular ball bearing therein, and wherein the valve stem is rotatably positioned vertically through the circular ball bearing within the journal cutout.

7. The knife gate valve of claim 1, wherein the journal cutout is shaped as a cylinder and sized to receive the valve stem vertically therethrough, and further comprising an external flange bearing positioned on a top surface of the yoke, wherein the external flange bearing maintains the vertical position of the valve stem, and wherein the valve stem is rotatable within the external flange bearing to operate the shutoff apparatus.

8. The knife gate of claim 1, wherein the head portion of the valve stem comprises a cut-out through a top of the head portion and extending along a portion of a length of the valve stem, and wherein the cut-out is sized and shaped to directly receive a powered rotational tool within the cut-out to operate the shutoff apparatus.

9. A handwheel, comprising:
an outer handle; and
a center plate having a bottom portion and a top portion, wherein the bottom portion is sized and shaped to engage with a shaft or a valve stem, and wherein the top portion is sized and shaped to engage with a rotational socket.

10. The handwheel of claim 9, wherein the top portion further comprises a cut-out through a top of the top portion and extending along a portion of a length of the top portion, and wherein the cut-out is sized and shaped to directly receive a powered rotational tool within the cut-out to operate the handwheel.

11. The handwheel of claim 9, wherein the top portion further comprises a threaded interior cavity sized and shaped to receive a threaded bolt therein, and wherein the threaded bolt is tightenable to fasten the handwheel to the shaft or valve stem in communication with the bottom portion.

12. The handwheel of claim 9, wherein a shape of the bottom portion is one from the set of: slotted, round, hexagonal, square, splined, Torx, and 12-point.

13. A stemmed valve apparatus, comprising:
a shutoff apparatus;
a first valve stem in communication with the shutoff apparatus;
a rotational transfer system in communication with the first valve stem;
a second valve stem in communication with the rotational transfer system, the second valve stem having an end sized to engage with a powered rotational tool, wherein rotation of the second valve stem within the rotational transfer system causes the first valve stem to rotate, and wherein the rotation of the first and second valve stems operates the shutoff apparatus to open and close; and
a handwheel comprising an outer handle and a center late the center late having a shaped cutout extending completely through the center plate, wherein the handwheel is insertably positioned over at least a portion of the second valve stem through the shaped cut-out.

14. The stemmed valve apparatus of claim 13, wherein the second valve stem further comprises a cut-out through an exterior aspect of the second valve stem and extending along a portion of a length of the second valve stem, and wherein the cut-out is sized and shaped to directly receive a powered rotational tool within the cut-out to operate the shutoff apparatus.

15. The stemmed valve apparatus of claim 13, wherein the rotational transfer system is a gearbox or a bevel gear arrangement.

16. The stemmed valve apparatus of claim 13, wherein the end of the second valve stem is shaped as a hexagon.

17. An impact-driven valve, comprising:
a shutoff apparatus; and
a valve stem in communication with the shutoff apparatus, the valve stem comprising:
a threaded portion; and
a head portion at an upper aspect of the valve stem above the threaded portion sized and shaped to engage with a powered rotational tool.

18. The impact-driven valve of claim 17, wherein the head portion is sized and shaped to engage with a socket attachment to a powered rotational tool.

* * * * *